US008287362B2

(12) United States Patent
Okada

(10) Patent No.: US 8,287,362 B2
(45) Date of Patent: Oct. 16, 2012

(54) GAME SERVER, GAME MACHINE, GAME CONTROL SERVER, AND GAME CONTROL METHOD

(75) Inventor: Kazuo Okada, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 671 days.

(21) Appl. No.: 12/183,588

(22) Filed: Jul. 31, 2008

(65) Prior Publication Data

US 2008/0311982 A1 Dec. 18, 2008

Related U.S. Application Data

(63) Continuation of application No. 10/265,130, filed on Oct. 7, 2002, now abandoned.

(30) Foreign Application Priority Data

Oct. 9, 2001 (JP) ................................ 2001-311840

(51) Int. Cl.
*A63F 13/10* (2006.01)

(52) U.S. Cl. ........................................... 463/25; 463/26

(58) Field of Classification Search .................... 463/25, 463/30, 31, 40–42, 9, 16, 20, 26–28
See application file for complete search history.

(56) References Cited

U.S. PATENT DOCUMENTS

| | | | |
|---|---|---|---|
| 4,283,709 A | 8/1981 | Lucero et al. | |
| 4,524,459 A | 6/1985 | Titchenal | |
| 4,624,459 A | 11/1986 | Kaufman | |
| 4,652,998 A | 3/1987 | Koza et al. | |
| 4,657,256 A | 4/1987 | Okada | |
| 4,669,731 A | 6/1987 | Clarke | |
| 4,718,672 A | 1/1988 | Okada | |
| 4,775,937 A | 10/1988 | Bell | |
| 4,837,728 A | 6/1989 | Barrie et al. | |
| 4,964,638 A | 10/1990 | Ishida | |
| 4,993,713 A | 2/1991 | Harada | |
| 5,010,995 A | 4/1991 | Okada | |
| 5,016,880 A * | 5/1991 | Berge | 463/27 |
| 5,178,390 A | 1/1993 | Okada | |
| 5,229,764 A | 7/1993 | Matchett et al. | |
| 5,280,909 A | 1/1994 | Tracy | |

(Continued)

FOREIGN PATENT DOCUMENTS

DE 3242890 A1 5/1984

(Continued)

OTHER PUBLICATIONS

Office Action mailed Dec. 10, 2010, in co-pending U.S. Appl. No. 12/183,720.

(Continued)

*Primary Examiner* — David L Lewis
*Assistant Examiner* — Matthew D. Hoel
(74) *Attorney, Agent, or Firm* — Oblon, Spivak, McClelland, Maier & Neustadt, L.L.P.

(57) ABSTRACT

The cumulative credit consumptions of game machines are controlled per player. When the cumulative credit consumption of a player reaches an upper limit, a return is executed to the player based on a predetermined return rate. In addition, the return rate can be changed to produce high game characteristics. Therefore, the player can perform a game without anxiety, while enjoying amusement of the game. At the result, the problem of missing customers can be eliminated.

14 Claims, 21 Drawing Sheets

U.S. PATENT DOCUMENTS

| | | | | |
|---|---|---|---|---|
| 5,429,361 | A | 7/1995 | Raven et al. | |
| 5,564,700 | A | 10/1996 | Celona | |
| 5,611,730 | A | 3/1997 | Weiss | |
| 5,639,088 | A | 6/1997 | Schneider et al. | |
| 5,655,961 | A | 8/1997 | Acres et al. | |
| 5,674,128 | A | 10/1997 | Holch et al. | |
| 5,695,402 | A | 12/1997 | Stupak | |
| 5,702,303 | A | 12/1997 | Takemoto et al. | |
| 5,768,382 | A | 6/1998 | Schneier et al. | |
| 5,770,533 | A | 6/1998 | Franchi | |
| 5,810,665 | A | 9/1998 | Takemoto et al. | |
| 5,820,459 | A | 10/1998 | Acres et al. | |
| 5,836,817 | A | 11/1998 | Acres et al. | |
| 5,836,819 | A | 11/1998 | Ugawa | |
| 5,884,274 | A | 3/1999 | Walker et al. | |
| 5,890,963 | A | 4/1999 | Yen | |
| 5,910,048 | A | 6/1999 | Feinbert | |
| 6,001,016 | A | 12/1999 | Walker et al. | |
| 6,003,013 | A | 12/1999 | Boushy et al. | |
| 6,018,718 | A | 1/2000 | Walker et al. | |
| 6,089,980 | A | 7/2000 | Gauselmann | |
| 6,113,493 | A | 9/2000 | Walker et al. | |
| 6,135,884 | A | 10/2000 | Hedrick et al. | |
| 6,196,547 | B1 | 3/2001 | Pascal et al. | |
| 6,224,482 | B1 | 5/2001 | Bennett | |
| 6,234,896 | B1 | 5/2001 | Walker et al. | |
| 6,241,608 | B1 | 6/2001 | Torango | |
| 6,244,957 | B1 | 6/2001 | Walker et al. | |
| 6,254,483 | B1 | 7/2001 | Acres | |
| 6,257,981 | B1 | 7/2001 | Acres et al. | |
| 6,270,409 | B1 | 8/2001 | Shuster | |
| 6,273,820 | B1 | 8/2001 | Haste, III | |
| 6,312,333 | B1 | 11/2001 | Acres | |
| 6,319,125 | B1 * | 11/2001 | Acres .............................. | 463/25 |
| 6,409,602 | B1 | 6/2002 | Wiltshire et al. | |
| 6,416,409 | B1 * | 7/2002 | Jordan ............................ | 463/27 |
| 6,439,995 | B1 | 8/2002 | Hughs-Baird et al. | |
| 6,471,591 | B1 * | 10/2002 | Crumby .......................... | 463/26 |
| 6,517,433 | B2 | 2/2003 | Loose et al. | |
| 6,575,832 | B1 * | 6/2003 | Manfredi et al. ............... | 463/25 |
| 6,626,758 | B1 * | 9/2003 | Parham et al. .................. | 463/25 |
| 6,638,165 | B2 | 10/2003 | Uchiyama et al. | |
| 6,645,078 | B1 | 11/2003 | Mattice | |
| 6,695,697 | B1 | 2/2004 | Okada | |
| 6,857,958 | B2 | 2/2005 | Osawa | |
| 6,878,063 | B2 | 4/2005 | Manfredi et al. | |
| 6,932,704 | B2 | 8/2005 | Walker et al. | |
| 6,932,707 | B2 | 8/2005 | Duhamel | |
| 6,984,173 | B1 | 1/2006 | Piechowiak et al. | |
| 7,465,232 | B2 | 12/2008 | Okada | |
| 2002/0198039 | A1 | 12/2002 | Marks et al. | |
| 2003/0013516 | A1 | 1/2003 | Walker et al. | |
| 2003/0054873 | A1 | 3/2003 | Peterson | |
| 2003/0064809 | A1 | 4/2003 | Okada | |
| 2003/0064810 | A1 | 4/2003 | Okada | |
| 2003/0069067 | A1 | 4/2003 | Okada | |
| 2003/0069073 | A1 | 4/2003 | Okada | |
| 2003/0073486 | A1 | 4/2003 | Okada | |
| 2003/0073487 | A1 | 4/2003 | Okada | |
| 2003/0078095 | A1 | 4/2003 | Okada | |
| 2003/0119585 | A1 | 6/2003 | Walker et al. | |
| 2003/0220138 | A1 | 11/2003 | Walker et al. | |
| 2004/0048646 | A1 | 3/2004 | Visocnik | |
| 2005/0059480 | A1 | 3/2005 | Soukup et al. | |
| 2006/0009276 | A1 | 1/2006 | Okada | |
| 2007/0060250 | A1 | 3/2007 | Okada | |
| 2007/0060277 | A1 | 3/2007 | Okada | |
| 2007/0060278 | A1 | 3/2007 | Okada | |
| 2007/0060279 | A1 | 3/2007 | Okada | |
| 2007/0060280 | A1 | 3/2007 | Okada | |
| 2007/0060281 | A1 | 3/2007 | Okada | |
| 2007/0060282 | A1 | 3/2007 | Okada | |
| 2007/0060283 | A1 | 3/2007 | Okada | |
| 2007/0060324 | A1 | 3/2007 | Okada | |
| 2007/0105609 | A1 | 5/2007 | Okada | |
| 2007/0105621 | A1 | 5/2007 | Okada | |
| 2007/0105622 | A1 | 5/2007 | Okada | |
| 2007/0149269 | A1 | 6/2007 | Benbrahim | |
| 2008/0058050 | A1 | 3/2008 | Okada | |
| 2008/0058066 | A1 | 3/2008 | Okada | |
| 2008/0064473 | A1 | 3/2008 | Okada | |
| 2008/0064474 | A1 | 3/2008 | Okada | |
| 2008/0064475 | A1 | 3/2008 | Okada | |
| 2008/0064476 | A1 | 3/2008 | Okada | |
| 2008/0096632 | A1 | 4/2008 | Okada | |
| 2008/0102922 | A1 | 5/2008 | Okada | |
| 2008/0102930 | A1 | 5/2008 | Okada | |
| 2008/0119259 | A1 | 5/2008 | Okada | |
| 2008/0119262 | A1 | 5/2008 | Okada | |
| 2008/0125216 | A1 | 5/2008 | Okada | |
| 2008/0139287 | A1 | 6/2008 | Okada | |
| 2008/0139291 | A1 | 6/2008 | Okada | |
| 2008/0146310 | A1 | 6/2008 | Okada | |
| 2008/0153571 | A1 | 6/2008 | Okada | |
| 2008/0161090 | A1 | 7/2008 | Okada | |
| 2008/0214275 | A1 | 9/2008 | Okada | |
| 2008/0293482 | A1 | 11/2008 | Okada | |

FOREIGN PATENT DOCUMENTS

| | | | |
|---|---|---|---|
| DE | 3712841 | A1 | 11/1988 |
| DE | 4137010 | | 8/1992 |
| DE | 100 49 444 | A1 | 11/2001 |
| EP | 0 631 798 | | 1/1995 |
| EP | 0 840 264 | A1 | 5/1998 |
| EP | 1 192 975 | A1 | 4/2002 |
| EP | 1 302 914 | A2 | 4/2003 |
| EP | 1 351 180 | | 10/2003 |
| EP | 1 477 947 | | 11/2004 |
| EP | 1 544 811 | A2 | 6/2005 |
| GB | 2326830 | | 1/1999 |
| JP | 61-118377 | U | 7/1986 |
| JP | 4-244178 | A | 9/1992 |
| JP | 6-70951 | | 3/1994 |
| JP | 6-079051 | A | 3/1994 |
| JP | 7-171262 | | 7/1995 |
| JP | 7-299234 | A | 11/1995 |
| JP | 8-24401 | | 1/1996 |
| JP | 8-29169 | B | 3/1996 |
| JP | 8-336657 | A | 12/1996 |
| JP | 9-28905 | | 2/1997 |
| JP | 9-094340 | A | 4/1997 |
| JP | 9-103576 | | 4/1997 |
| JP | 9-264777 | | 10/1997 |
| JP | 10-33820 | | 2/1998 |
| JP | 10-94666 | | 4/1998 |
| JP | 10-118247 | | 5/1998 |
| JP | 10-234945 | | 9/1998 |
| JP | 11-19276 | | 1/1999 |
| JP | 11-146938 | | 6/1999 |
| JP | 11-253640 | | 9/1999 |
| JP | 2000-342772 | | 12/2000 |
| JP | 2001-70510 | | 3/2001 |
| JP | 2001-204885 | | 7/2001 |
| JP | 2001-259205 | | 9/2001 |
| JP | 2001-269441 | | 10/2001 |
| JP | 2003-47775 | | 2/2003 |
| JP | 2003-47779 | | 2/2003 |
| JP | 2003-53041 | | 2/2003 |
| JP | 2003-53042 | | 2/2003 |
| JP | 2003-71096 | | 3/2003 |
| JP | 2003-71097 | | 3/2003 |
| JP | 2003-71098 | | 3/2003 |
| JP | 2003-111888 | | 4/2003 |
| JP | 2003-111889 | | 4/2003 |
| JP | 2003-111890 | | 4/2003 |
| JP | 2003-111891 | | 4/2003 |
| JP | 2003-111897 | | 4/2003 |
| JP | 2003-117053 | | 4/2003 |
| JP | 2003-117070 | | 4/2003 |
| JP | 2003-117071 | | 4/2003 |
| JP | 2003-117072 | | 4/2003 |
| JP | 2003-117073 | | 4/2003 |
| JP | 2003-177073 | | 4/2003 |
| JP | 2003-126343 | | 5/2003 |
| JP | 2003-205072 | | 7/2003 |
| WO | WO 03/083795 | A1 | 10/2003 |
| WO | WO 2004/095383 | | 11/2004 |

OTHER PUBLICATIONS

Office Action mailed Dec. 10, 2010, in co-pending U.S. Appl. No. 12/183,814.
Office Action mailed Oct. 12, 2010, in co-pending U.S. Appl. No. 11/734,993.
Office Action mailed Oct. 25, 2010, in co-pending U.S. Appl. No. 11/735,104.
Office Action mailed Oct. 27, 2010, in co-pending U.S. Appl. No. 11/735,062.
Office Action mailed Nov. 2, 2010, in co-pending U.S. Appl. No. 12/183,654.
"Pachi-Slot Hisshogaido", Byakuya-Shobo Co., Ltd., 7th Volume, No. 14, Oct. 1, 1996, pp. 88-89 (with English Abstract).
""Pachi-Slot Daizukan 2001" Byakuya-Shobo Co., Ltd. May 12, 2001, pp. 22, 24, 36".
"Trick Monster 2, Pachi-Slot Hisshogaido Max 2001, Oct. 2001" Byakuya-Shobo, Oct. 1, 2001, 4 pages (With English Abstract).
Office Action mailed Aug. 27, 2010, in co-pending U.S. Appl. No. 12/183,804.
Office Action issued Dec. 14, 2010 in Japan Application No. 2007-204698.

* cited by examiner

FIG. 15

| PROCESS NUMBER | UPPER LIMIT (IN THOUSANDS OF YEN) | RETURN RATE(%) | PRESENCE OF RETURN | RETURN AMOUNT (IN THOUSANDS OF YEN) | SETTING TIME |
|---|---|---|---|---|---|
| 1 | 10 | 10 | 1 | 1 | 10:00 |
| 2 | 70 | 20 | 0 | 0 | 10:21 |
| 3 | 30 | 15 | 0 | 0 | 10:49 |
| 4 | 100 | 70 | 1 | 70 | 11:03 |
| 5 | 40 | 15 | 0 | 0 | 11:39 |
| ...... | ...... | ...... | ...... | ...... | ...... |
| 9 | 50 | 110 | 1 | 55 | 12:42 |
| 10 | 30 | – | – | – | – |

FIG. 18

| MACHINE-NUMBER | UPPER LIMIT (IN THOUSANDS OF YEN) | RETURN RATE(%) | RETURN AMOUNT (IN THOUSANDS OF YEN) |
|---|---|---|---|
| G01-01 | 10 | 10 | 1 |
| G01-02 | 70 | 20 | 0 |
| G01-03 | 30 | 15 | 0 |
| G01-04 | 100 | 70 | 70 |
| G01-05 | 40 | 15 | 0 |
| ⋮ | ⋮ | ⋮ | ⋮ |
| G01-09 | 50 | 110 | 55 |
| G01-10 | 30 | — | — |

FIG. 21

| MACHINE GROUP-NUMBER | UPPER LIMIT (IN THOUSANDS OF YEN) | RETURN RATE(%) | RETURN AMOUNT (IN THOUSANDS OF YEN) |
|---|---|---|---|
| G01 | 10 | 10 | 1 |
| G01 | 70 | 20 | 0 |
| G01 | 30 | 15 | 0 |
| G01 | 100 | 70 | 70 |
| G01 | 40 | 15 | 0 |
| ⋮ | ⋮ | ⋮ | ⋮ |
| G01 | 50 | 110 | 55 |
| G01 | 30 | — | — |

GAME SERVER, GAME MACHINE, GAME CONTROL SERVER, AND GAME CONTROL METHOD

CROSS REFERENCE TO RELATED APPLICATIONS

This application is a Continuation of and is based upon and claims the benefit of priority under 35 U.S.C. §120 for U.S. Ser. No. 10/265,130, filed Oct. 7, 2002 now abandoned, the entire contents of each which are incorporated herein by reference. U.S. Ser. No. 10/265,130 also claims the benefit of priority under 35 U.S.C. §119 from Japanese Patent Application No. 2001-311840, filed Oct. 9, 2001.

FIELD OF THE INVENTION

The present invention relates to a technique of controlling a return to game machines for pachislo game (Japanese slot game), pachinko game (pinball game), etc.

BACKGROUND OF THE INVENTION

A game machine for pachislo game, pachinko game, etc. is generally constructed so that a game is started when the player throws a game medium, such as a medal, in the game machine. This game machine is set so as to pay out the game medium corresponding to the winning state (style) occurred during the game.

This game machine generates a winning state, e.g., so-called "big prize," at a preset probability. Therefore, the player performs the game in expectation of a big prize on the game machine that the player is currently playing.

The game machine that produces a prize depending on the probability as described does not always produce the prize at a fixed probability. That is, it is constructed so as to converge on a preset probability when a significant number of games are digested. Therefore, (i) a prize easily occurs on a player performing a small number of games, and (ii) a prize is not always guaranteed to a player performing a large number of games. With the game machine of this type, gambling characteristics can be enhanced to make the game more amusing. On the other hand, the player waiting for a prize for a long time might lose enthusiasm for the game. This leads to a tendency to miss the player (customer).

In order to solve the above disadvantage, a variety of game machines have been proposed.

In a game machine disclosed in Japanese Patent Unexamined Publication No. 8-24401, there are two probability tables for controlling the probability of generating a big prize. In the case that the player performs a large number of games and gets tired of waiting for a prize, one of the two probability tables that has a higher probability is selected for change, thereby increasing the probability of generating the prize.

Japanese Patent Unexamined Publication Nos. 6-79051 and 11-253640 have proposed game machines employing such means, being called "return." The term "return" means to pay out a certain game medium (e.g., medal) to a game machine satisfying predetermined conditions, in accordance with the amount of game media that the player thrown in the machine. A return type game machine of the former further increases game characteristics by controlling the return rate as a basis for payout of game media. A return type game machine of the latter adjusts the probability of generating a prize in consideration of the profit rate in the parlor and the return rate to each game machine.

Concretely, in the game machines disclosed in the above Publication Nos. 6-79051 and 11-253640, the probability of generating a prize and the return rate are adjusted so as to eliminate the drawback that the player performing a large number of games is less likely to generate a prize, as is often with the conventional game machines.

Although the game machine of the above Publication No. 8-24401 has succeeded in eliminating unevenness in the probability of generating a prize, the following problem remains.

In this game machine, control of "unevenness" is performed per game machine. It is therefore impossible to eliminate imbalance between players. At the result, the player cannot enjoy the game without anxiety. For instance, one player continues a game with one game machine for a while, without receiving any prize, and then moves to other game machine. Immediately thereafter, another player who starts a game with one game machine is more likely to generate a prize. Under the circumstances, it is unavoidable that the player is in constant suspense when continuing the game with one game machine and when moving to another game machine. Therefore, the problem that the player is away from the game machine due to such suspense, being called "missing customers," remains unsolved.

As in the game machine of the above Publication No. 8-24401, the game machines of return type in the above Publication Nos. 6-79051 and 11-253640 control the return per game machine. Therefore, both machines also suffer from the same drawback, and the problem of missing customers remains unsolved.

SUMMARY OF THE INVENTION

Accordingly, it is an object of the present invention to eliminate the problem of missing customers by providing such circumstances that players can perform a game without anxiety, while enjoying amusement of the game.

The above object is achievable by the following characteristic features:

(1) A game machine group is collectively controlled which is comprised of a plurality of game machines that are brought into a status enabling to start a game based on a throw-in coin number or given credit number, and are given payout according to the result of the game. Based on information of credit consumption in a game machine that a player is performing a game, it is judged whether cumulative credit consumption reaches a predetermined upper limit. When the result of this judgment is that the cumulative credit consumption reaches the predetermined upper limit, a return based on a predetermined return rate is executed without fail or based on the result of a lottery for determining whether the return is executed. When executing the return, the value of a return rate of one game machine in the game machine group is changed depending on the values of return rates of other game machines. Therefore, variations in the value of return rate between game machines give a fun of selecting one from the plurality of game machines. In addition, it is possible to increase the efficiency of control when the return rate is changed per game machine. For example, if the return rates of game machines are individually changed, the total return rates cannot be checked at any time. At the result, the return rates of the individual game machines might be extremely high or low. To solve this problem, the return rates of individual game machines are collectively controlled in the present invention.

A game machine having higher game characteristics can be provided by changing the return rate as described above. That is, the return rate of one game machine changes depending on the return rates of other game machines in the same group. Therefore, the player pays attention not only the return rate of the game machine that the player is performing a game, but also the return rates of other game machines in the same group. At the result, the player will perform a game while continuously getting a higher thrill.

(2) If the game machine is not constructed such that the player can recognize a return rate, the player will not care about a preset return rate value, thus failing to increase game characteristics. Whereas in the present invention, a return rate set to a game machine where a player is performing a game is displayed on a display part of the game machine.

In the absence of such display, the player is unaware as to "when the return rate was changed on the game machine where the player is performing a game," and "how much did the return rate was changed." Therefore, the player is anxious about the return rate and unable to enjoy such an increasing thrill produced by changing the return rate. On the other hand, when the changed return rate is displayed as described above, the player can continue a game without anxiety, while paying attention to the return rate.

Preferably, on the display part of a game machine that a player performs a game, there may be displayed the upper limit value set to the game machine and the player's cumulative credit consumption or the rate of the cumulative credit consumption to the upper limit (i.e., percentage achievement to the upper limit).

In the absence of this display, a player will continue a game without being informed of when the game machine reaches the upper limit. This increases the player's anxiety. On the other hand, when the percentage achievement to the upper limit is displayed as described above, the player can continue the game without anxiety.

In an alternative, the above-mentioned return may be executed reliably to a game machine that reached the predetermined upper limit, and, based on the result of a timing lottery for determining the timing at which the return is executed. In this case, the return is reliably executed to the game machine that has reached the upper limit. That is, the player is guaranteed with the return thereby to perform the game without anxiety. In addition, since the return timing is determined by lottery, the return is not always executed as soon as the arrival at the upper limit, thereby increasing game characteristics.

If the game machine is not constructed such that a player can recognize the arrival at the upper limit, the player will not pay attention to the upper limit value, thus failing to increase game characteristics. It is therefore preferred that the player be informed of the arrival at the upper limit.

Preferably, it may be detected that one player performing a game on a certain game machine stops the game before reaching a predetermined upper limit and another player starts a game on this game machine. In other words, the arrival at a predetermined upper limit has conventionally been judged per game machine. Whereas in the present invention, that is judged per player, so that the player is guaranteed for a certain return. For example, if it is compared that one player often changes game machines with that the player continues to perform a game on the same game machine, the latter has a high possibility that a return is executed when the cumulative credit consumption of the player reaches a predetermined upper limit. Therefore, the player is more likely to continue a game on the same game machine. This may solve the problem of missing customers that does exist in the conventional game machines.

When it is detected that one player of a certain game machine stops a game before reaching a predetermined upper limit and another player starts a game on the game machine, the cumulative credit consumption of one player, namely the previous player, may be reset. By doing so, it is possible to minimize such imbalance between players that when one player changes one game machine to another, "a credit return is executed immediately after another player who is the next succeeding player of the one game machine starts a game." At the result, it is possible to recover customers who have been kept away from the game machine because of imbalance between players.

(3) Preferably, the overall return rate of a game machine group under collective control is changed such that its average is kept at a certain value under predetermined conditions. Therefore, the player can perform a game while getting a still higher thrill. That is, it does not mean to merely change the return rate. For example, the return rate of one player on a certain game machine might be over 100%, when those of other game machines in the same group are low. At the arrival of a predetermined upper limit, one player can obtain a return exceeding his/her total thrown-in on that game machine. By way of contrast, in some cases, the return rate of the game machine of one player is low and those of other game machines are high. This leads to a game machine having still higher game characteristics.

(4) Preferably, relating to the above-mentioned predetermined conditions, returns rates are changed such that its average is kept at a certain value, on the basis of a predetermined number of processes or a predetermined period of time. This guarantees a profit to the game machine provider. Concretely, taking the style of merely changing return rates, if a succession of returns occurs at a high return rate, the amount of credit required for these returns might put a squeeze on the game machine provider's profits. Therefore, the profit of the game machine provider can also be kept constant by making the average value of return rates constant under a certain criteria.

DEFINITION OF TERMS (1) The term "game machine" is to be interpreted in a concept as including pachinko game machines and slot game machines, and one which has a mechanism capable of performing games in order to increase the player's profit by using some medium.

(2) The term "game machine group" means a group of a plurality of the above game machines. Although it is usually to be interpreted in a concept indicating a collection of game machines arranged at the same island in a game center (hall), the term "game machine group" used in the present invention also includes a concept as including a collection of game machines that belong to any group set by the hall or game machine provider. Therefore, any ones under control of the same server can form a game machine group, even if their halls are placed apart, such as Tokyo and Osaka.

(3) The term "given credit number" is to be interpreted in a concept as including winning balls, medals, and cash (e.g., hard money, and paper money) which the player throws in the game machine for playing a game, as well as one which is made into numeric character data in the form of numerical data, electric money, prepaid card, etc.

(4) The term "consumption" means that the player intimates his/her intension to play a game and actually plays the game by using the given credit, without reference to tangible or intangible.

(5) The term "predetermined upper limit" means in principle one which is used as the basis for return to be set per game machine. For example, the upper limit is set with the use of the following basis; (i) the number of medals used in a slot game machine; and (ii) how many times the player rotates a rotating drum of the slot game machine (i.e., the number of plays).

(6) The term "return" means in principle one which is changed depending on the setting contents of the mentioned predetermined upper limit, and which is generally obtained by multiplying the upper limit value by a return rate. Concretely, (i) when the basis for the predetermined upper limit is the number of medals used in a slot game machine etc., a return is executed by offering medals to the player; and (ii) when the basis for the predetermined upper limit is the number of plays, a return is executed by offering a free play to the player.

The present invention, advantage in operating the same and aims which is attained by implementing the present invention will be better appreciated from the following detailed description of illustrative embodiments thereof, and the accompanying drawings.

BRIEF DESCRIPTION OF THE DRAWINGS

FIG. 15 shows an example of game history tables that the game server refers to when setting a return rate;

FIG. 18 shows an example of game history tables that the game server refers to when setting a return rate;

FIG. 21 is an example of game history tables that the game control server refers to when setting a return rate.

DETAILS DESCRIPTION OF THE PREFERRED EMBODIMENTS

Preferred embodiments of the present invention will be described below in detail, based on the accompanying drawings.

First Preferred Embodiment

[Overall Configuration of System]

Figure 1:
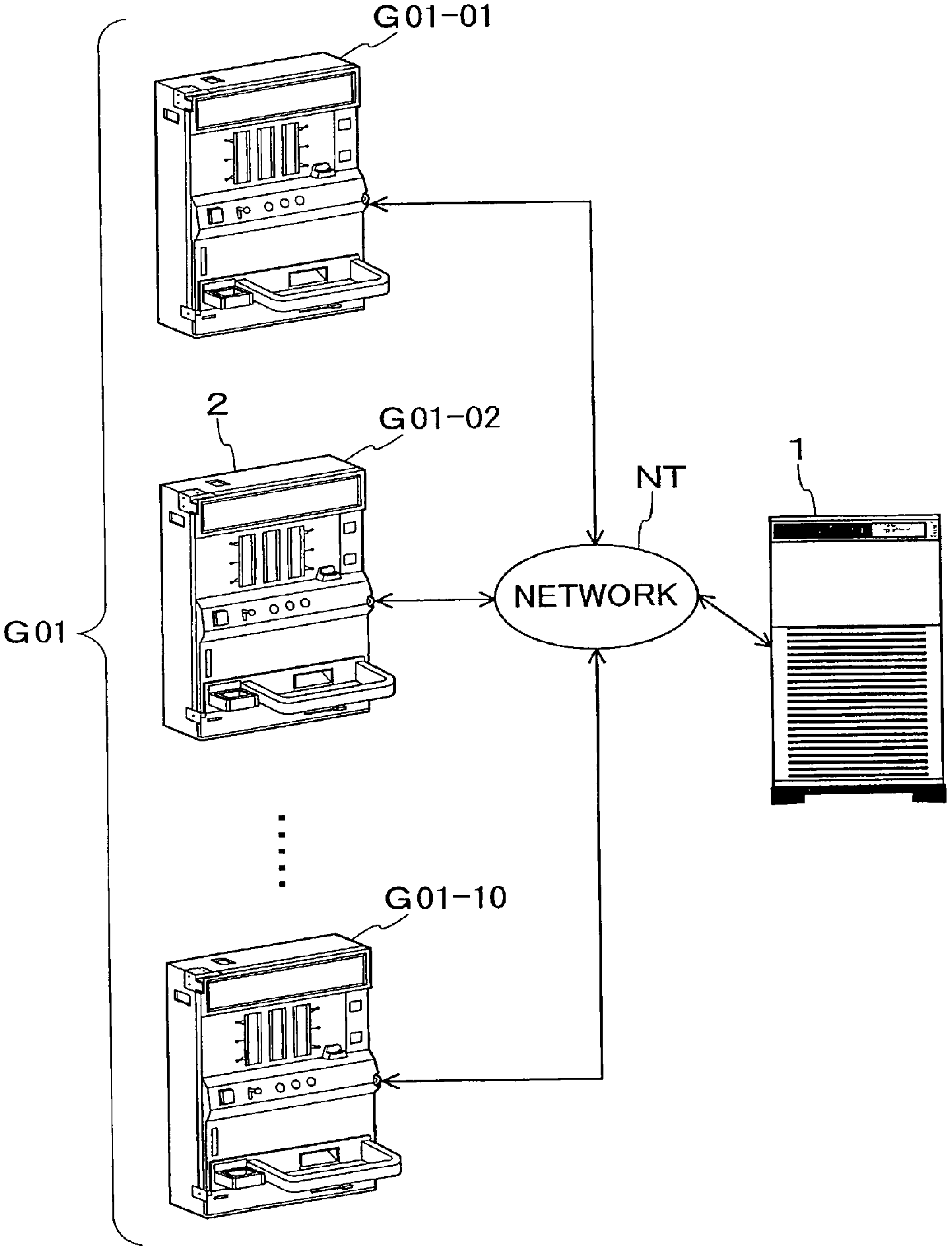
FIG. 1 is a diagram showing, in simplified form, the configuration of a credit return system according to a first preferred embodiment of the present invention.

FIG. 1 is a diagram showing, in a simplified form, the configuration of a credit return system according to a first preferred embodiment of the invention. Referring to FIG. 1, this credit return system comprises: (i) a game server 1; and (ii) a game machine group G01.

The game machine group G01 is comprised of a plurality of game machines 2. The game machines 2 are connected via a network NT to the game server 1 and can send to and receive from the game server 1 a variety of information via the network NT. Individual identification numbers (e.g., G01-01, G01-02, . . . G01-10) are assigned to the game machines 2.

The game server 1 collectively controls the game machines 2 of the game machine group G01, and discriminates the source of data sent from the game machines 2, based on the identification numbers being individual to the game machines 2. When the game server 1 sends data to the game machine 2, the game server 1 designates the destination of the data by using the corresponding identification number.

Data sent from and received by the game machine 2 contain: (i) the identification number being individual to this game machine (the identification number of the game machine assigned per game machine); and (ii) identification information to identify the player currently playing with the game machine. Based on the identification information, the game server 1 discriminates as to whether: (i) a game is performed on the game machine 2; and (ii) there is a player change on the game machine 2.

Hereinafter, the game server is merely referred to as a "server."

[Mechanical Configuration of Game Machines]

Figure 2:
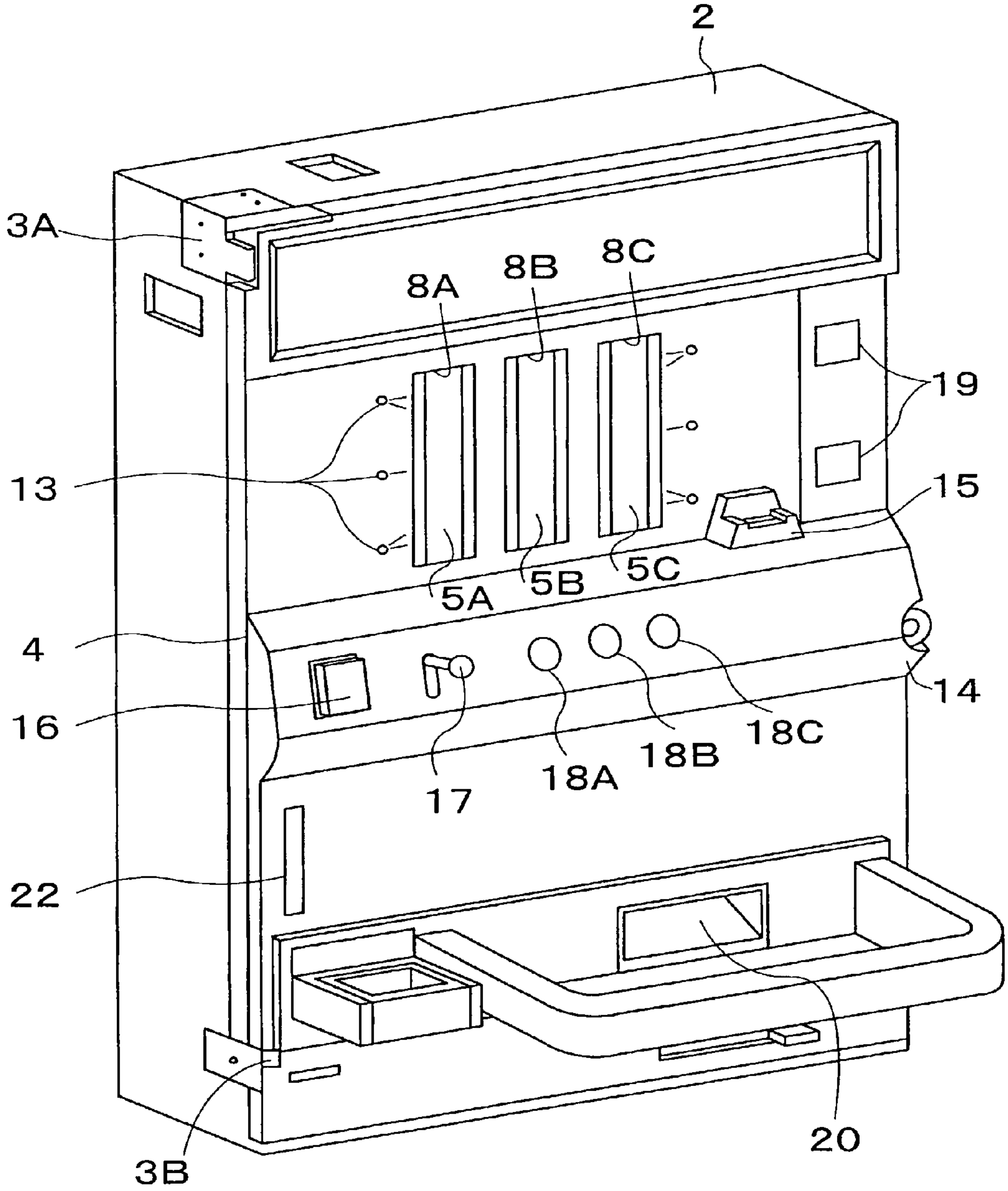
FIG. 2 is a perspective view showing the appearance of a game machine.
Figure 3:
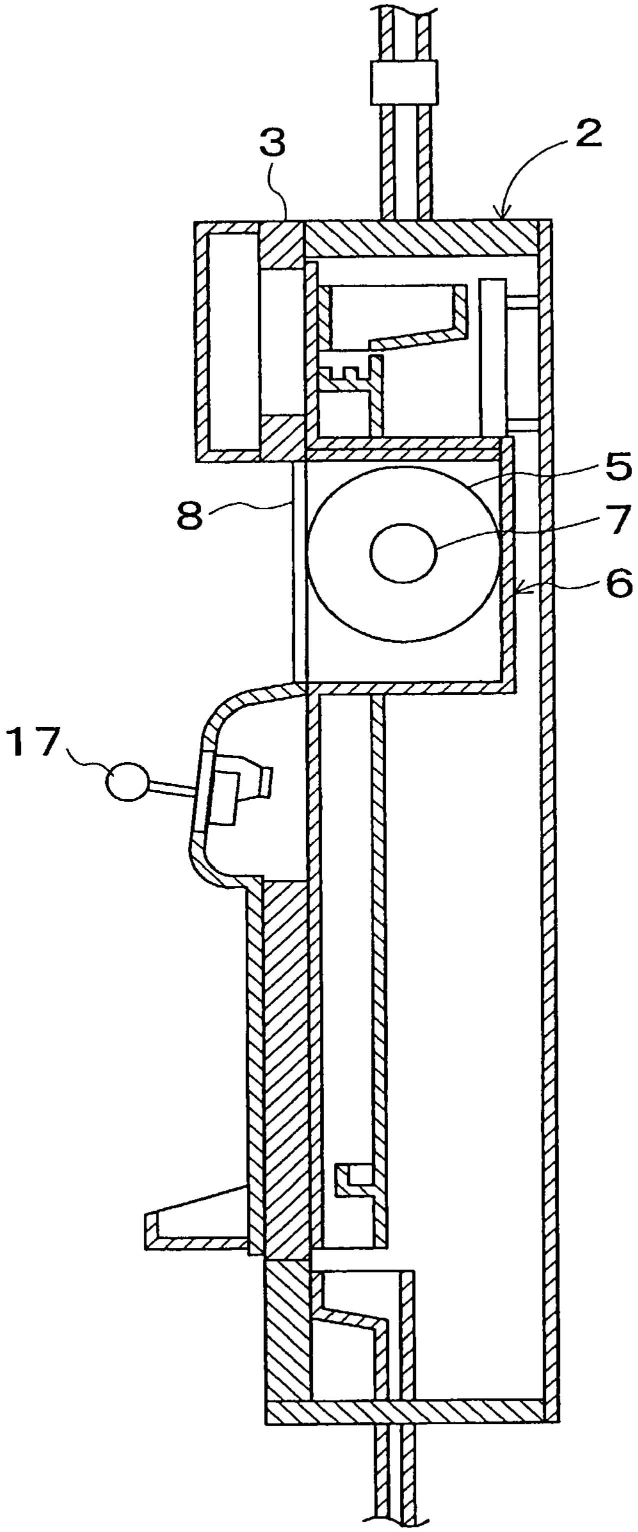
FIG. 3 is a vertical sectional view of the game machine.

FIG. 2 is a perspective view showing the appearance of a game machine. FIG. 3 is a vertical sectional view of the game machine. Referring to FIGS. 2 and 3, a game machine 2 is a slot game machine (slot machine) and has a frame body 3.

The frame body 3 is in the shape of hollow box. A front panel 4 is attached so that it is able to open and shut the frame body 3 via hinges 3A and 3B.

Attached to the rear surface of the front panel 4 is a casing 6, with which three rotating drums 5 (5A to 5C) arranged across the width thereof are covered from their back face.

The drums 5A to 5C are of tubular shape and are supported rotatively about rotary axes 7. Symbol marks (e.g., figure "7", bell, plum, cherry etc.) are respectively drawn on the peripheral surfaces of the drums 5A to 5C such that the symbol marks are aligned in a row around their periphery. Of the symbol marks drawn on the peripheral surfaces of the drums 5A to 5C, one symbol mark per drum is visible from the front side of the game machine 2 via windows 8A to 8C disposed on the front panel 4.

The rotary axes 7 of the drums 5A to 5C are attached rotatively via bearings (not shown) to a predetermined bracket (not shown) of the frame of the game machine 2. One ends of the rotary axes 7 are coupled to output axes of stepping motors 11A to 11C (see FIG. 4). Therefore, the drums 5A to 5C are rotatively driven by the stepping motors 11A to 11C, respectively, and controlled such that they are stopped at a predetermined rotational angle position by a control device 12 (see FIG. 4).

Projection parts (not shown) indicating a standard position are disposed on the peripheral end parts of the drums 5A to 5C. The control device 12 detects the rotational standard positions of the drums 5A to 5C when these projection parts cross the optical axes of optical sensors (not shown), which are disposed so as to correspond to the drums 5A to 5C. The rotational speed of the stepping motors 11A to 11C is set so as to make constant a speed at which symbol marks are displayed while changing.

Bet line indicator lamps 13 are disposed adjacent to the windows 8A to 8C. The lamps 13 are provided for indicating which line of plural symbol mark stop lines displayed on windows 8A to 8C has been selected as a bet object.

A control part 14 is located at approximately the mid section of the front panel 4, and a bet button 16 is disposed in the control part 14. The bet button 16 is provided for setting a bet of medals entered via a throw-in slot 15. When the player pushes the bet button 16 by the amount of medals on which the player desires to bet, the corresponding bet line indicator lamp 13 is light up. The upper limit of bet medals is three in the game machine 2.

The bet lines are different depending on the operation number of the bet button 16. By one operation, a single line extending horizontally in the middle stage of the windows 8A to 8C is the object of bet line. By two operations, the object of bet line amounts to three lines obtained by adding two lines extending horizontally in the upper and lower stage of the windows 8A to 8C, to the above-mentioned line. By three operations, the object of bet line amounts to five lines obtained by adding two lines on the diagonal of the windows 8A to 8C, to the above-mentioned three lines. Four or more operations are invalid.

Set of a bet medal number according to the above-mentioned procedure, the control device 12 takes medals corresponding to the bet medal number set by the player. By taking the medals, the condition of starting slot game is established. In this state, when the player operates a start lever 17, the control device 12 rotates the drums 5A to 5C.

The control part 14 has three stop buttons 18A to 18C disposed at locations that correspond to the drums 5A to 5C, respectively. When depressing the stop buttons 18A to 18C, the corresponding drum is stopped.

The front panel 4 has digital score indicators 19 for indicating the number of medals the player threw in for the game; and the number of medals to be discharged.

When one of predetermined specific combinations of symbol marks (winning state) in the drums 5A to 5C is aligned on the stop line on which the player bets, a medal marks (winning state) discharge device (not shown) is driven to discharge a predetermined number of medals to a medal payout tray 20.

Further, the front panel 4 has a card inlet 22, through which the player inserts a card storing an identification number data to identify the player when he/she plays a game with the game machine 2. A card reader 23 (see FIG. 4) reads the data of the inserted card.

[Electrical Configuration of Game Machine]

Figure 4:
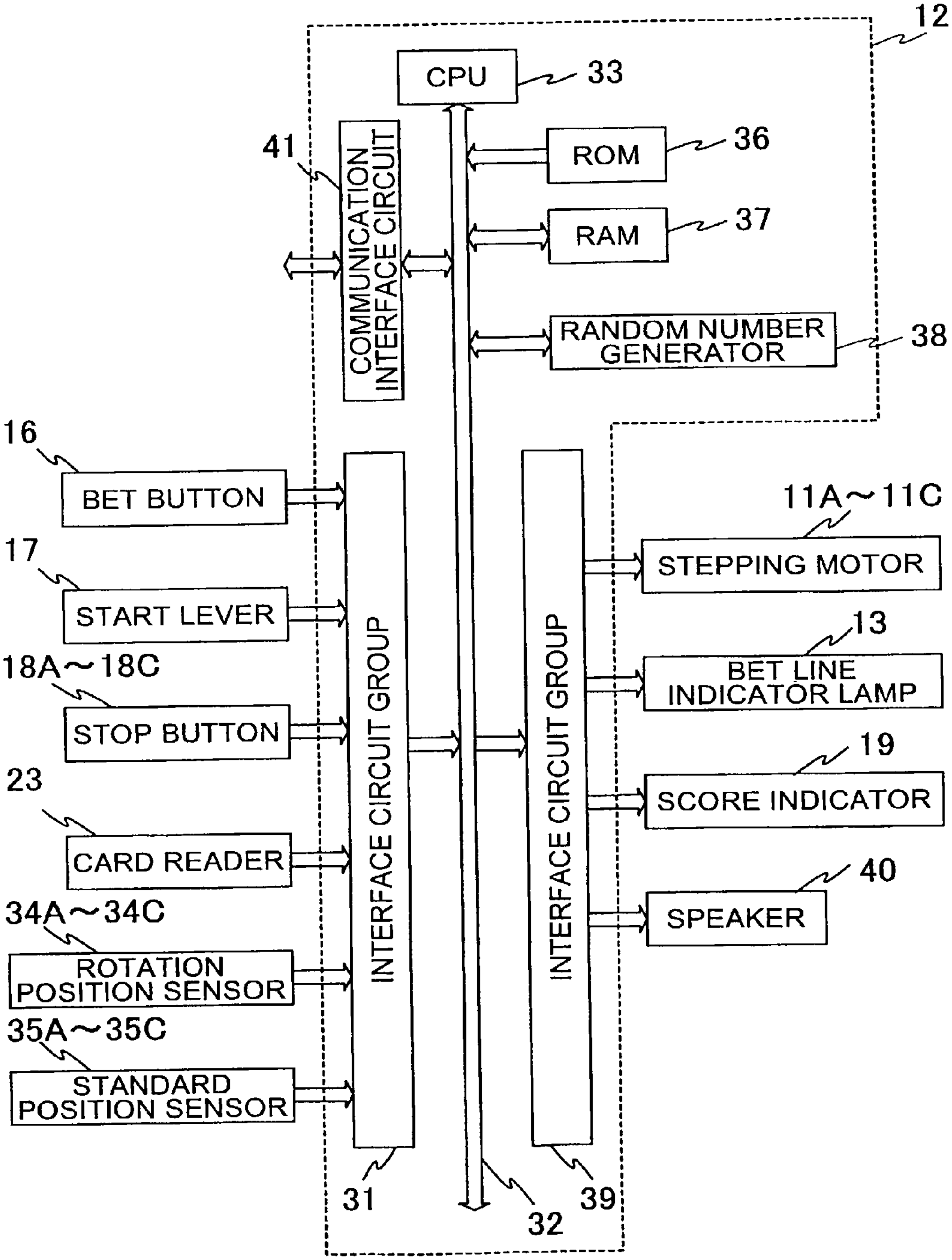
FIG. 4 is a block diagram showing the electrical configuration of the game machine.

FIG. 4 is a block diagram showing the electrical configuration of the game machine. Referring to FIG. 4, the control device 12 of the game machine 2 comprises: (i) first interface circuit group 31; (ii) input/output bus 32; (iii) CPU 33; (iv) ROM 36; (v) RAM 37; (vi) random number generator 38; (vii) second interface circuit group 39; and (viii) communication interface circuit 41.

The bet button 16 is connected to the first interface circuit group 31 being connected to the input/output bus 32. When the player depresses the bet button 16, an operation signal is issued from the bet button 16 to the interface circuit group 31. The interface circuit group 31 converts the operation signal to a predetermined voltage signal and provides it to the input/output bus 32. Therefore, before starting a game (play), a predetermined number of medals corresponding to a value indicated by the operation signal are thrown into the game machine 2 as the object of bet.

The input/output bus 32 performs input/output of data signals or address signals to the CPU 33.

The start lever 17 and stop buttons 18A to 18C are connected to the first interface circuit group 31, on which (i) a start-up signal issued from the start lever 17; and (ii) a stop signal issued from the stop buttons 18A to 18C, are converted to predetermined voltage signals and then provided to the input/output bus 32.

When the start lever 17 is operated to start a game, the start-up signal is provided to the CPU 33. Upon receiving the start-up signal, the CPU 33 issues a control signal to the stepping motors 11A to 11C in order to rotate the drums 5A to 5C.

When the stop buttons 18A to 18C are depressed to stop the drums 5A to 5C, the respective stop signals from the stop buttons 18A to 18C are provided to the CPU 33. If desired to stop the first drum 5A, the player operates the stop button 18A. If desired to stop the second drum 5B, the player operates the stop button 18B. If desired to stop the third drum 5C, the player operates the stop button 18C. Upon receiving the stop signal, the CPU 33 issues the stop signal to the stepping motors 11A to 11C, in order to stop the drum corresponding to the operated stop button.

Rotational position sensors 34A to 34C are connected to the first interface circuit group 31. The sensors 34A to 34C are disposed in the vicinity of the stepping motors 11A to 11C, respectively. The sensors 34A to 34C issue angle position signals that respectively indicate the rotational angle positions of the stepping motors 11A to 11C, to the interface circuit group 31. For example, rotary encoders are usable as the rotational position sensors 34A to 34C.

Standard position sensors 35A to 35C are connected to the first interface circuit group 31. The sensors 35A to 35C are disposed in the vicinity of the drums 5A to 5C, respectively. The sensors 35A to 35C are optical sensors as described above, and issue standard position signals to the interface circuit group 31 when detecting the standard positions of the drums 5A to 5C.

The card reader 23, which is disposed within the game machine 2, is connected to the first interface circuit group 31. The card reader 23 issues a card status signal at a predetermined timing, in accordance with a signal sending demand from the CPU 33. When a card is inserted into the card inlet 22, for example, the signal level of the card status signal is higher than a standard level. Based on the change in signal level, the CPU 33 detects that the card is inserted. On the other hand, when no card is inserted (i.e., the state that the card has been drawn out from the card inlet 22), for example, the level of the card status signal returns to the standard level. Based on the change in signal level, the CPU 33 detects that no card is inserted.

The CPU 33 detects: (i) an angle position signal issued from the rotational position sensors 34A to 34C; and (ii) a standard position signal issued from the standard position sensors 35A to 35C, thereby obtaining data of symbol marks displayed on the windows 8A to 8C.

The ROM 36 and RAM 37 are connected to the input/output bus 32. The ROM 36 stores: (i) a program for controlling the game machine and returning medals; and (ii) an initial value of variable used in the program. The ROM 36 stores data group indicating correspondence between a combination of symbol marks and random numbers. The RAM 37 stores flags and variable values.

The communication interface circuit 41 is connected to the input/output bus 32. The circuit 41 is used when performing sending/receiving of data between the game machine 2 and server 1.

The random number generator 38 for generating the above random numbers is connected to the input/output bus 32. When the CPU 33 issues an instruction for generating random numbers issued to the random number generator 38, the random number generator 38 generates random numbers in a predetermined range, and issues signals indicating the random numbers to the input/output bus 32. When a random number is issued from the random number generator 38, in order to determine a combination of symbol marks that corresponds to the random number, the CPU 33 searches the above data group and then substitutes a value corresponding to the combination for variables.

Usually either normal game or special game can be played with the game machine 2.

In the normal game, there are (i) an enabled prize-winning status that a combination of symbol marks stopped and displayed on an effective line can match a prize-winning pattern; and (ii) disabled prize-winning status that a combination of symbol marks cannot match a prize-winning pattern.

In the disabled prize-winning status, examples of symbol mark combinations that are changed on effective lines are: (i) failure pattern; and (ii) small prize pattern. The term "small prize" means that a predetermined number of symbol marks such as "cherry" and "bell" are aligned on the effective line, and a few medals are discharged to the payout tray 20. On the other hand, the term "failure pattern" means that symbol marks are not aligned on any effective line, and no medals are discharged. The disabled prize-winning status can move to the enabled prize-winning status by an internal lottery processing. In the disabled prize-winning status, any prize-winning pattern cannot be aligned irrespective of a timing at which the stop buttons 18A to 18C are depressed. Hence, it is impossible to move from the normal game status to the special play status.

On the other hand, only in the enabled prize-winning status, a combination of symbol marks stopped and displayed by a timing at which the stop buttons 18A to 18C are depressed will match a prize-winning pattern. In other words, this state allows for "aiming (observation push)." When a combination of symbol marks stopped and displayed on an effective line matches a prize-winning pattern, the player wins a prize and the game style moves to the special game providing a chance of obtaining a large number of medals. When the player fails to obtain any prize-winning pattern by missing a timing of depressing the stop buttons 18A to 18C, the above-mentioned failure pattern or small prize pattern is aligned on the effective line. If once the enable prize-winning status is set, this status continues until a combination of symbol marks stopped and displayed matches a prize-winning pattern. There is no move to the unable prize-winning status.

In the special game, there is extremely high probability that a combination of symbol marks stopped and displayed on an effective line will match a small prize pattern. This leads to a high possibility of obtaining a large number of medals. Upon finishing the special game, the game style moves to the normal game. When the normal game is performed after the special game, a decision as to whether the game proceeds in the enabled prize-winning status or the disabled prize-winning status is made by an internal lottery processing.

The second interface circuit group 39 is also connected to the input/output bus 32. To the circuit group 39, there is connected: (i) stepping motors 11A to 11C; (ii) bet line indicator lamp 13; (iii) score indicator 19; and (iv) speaker 40. The circuit group 39 applies a drive signal or drive power to each of these devices. For instance, when the player depresses the bet button 16, a drive current is applied to the bet line indicator lamp 13, in order to indicate a bet line that becomes effective in accordance with the number of throw-in medals. When the game is over, a drive signal is applied to the score indicator 19, in order to indicate the score corresponding to the prize-winning status. The speaker 40 issues an effect sound corresponding to the game status when the game is started or over.

[Configuration of Game Server]

Figure 5:
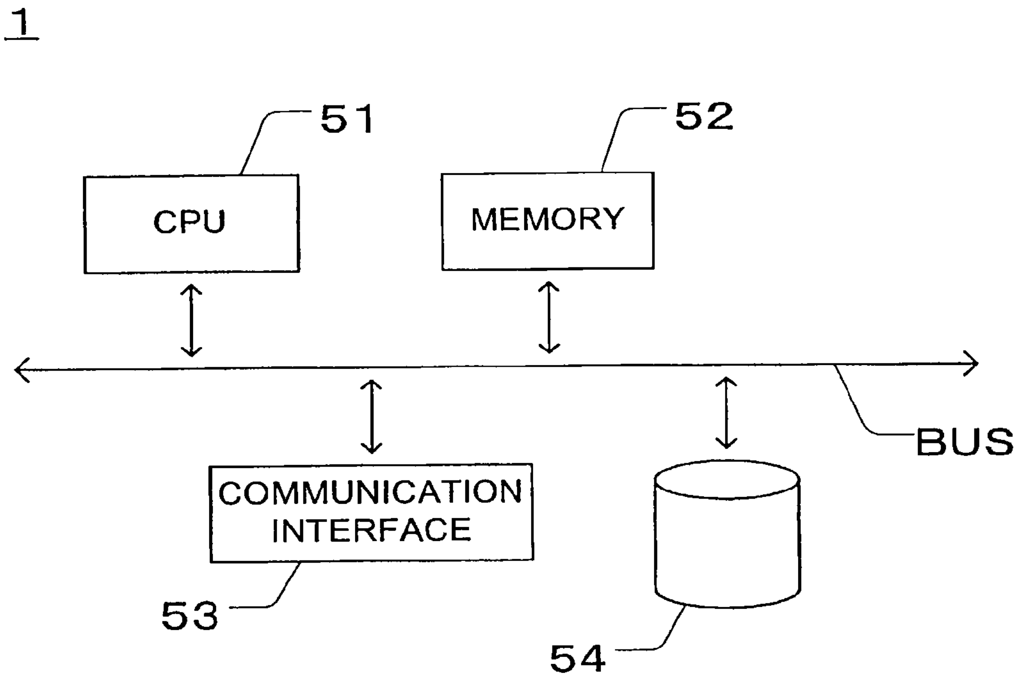
FIG. 5 is a block diagram showing the electrical configuration of a game server.

FIG. 5 is a block diagram showing the electrical configuration of the game server. Referring to FIG. 5, a server 1 has a data bus BUS. To the data bus BUS, there is connected (i) CPU 51; (ii) memory 52; (iii) communication interface 53; and (iv) database 54.

The CPU 51 executes various processing according to programs stored in the memory 52. Concretely, the CPU 51 receives data from the game machine 2 via a communication line connected by the communication interface 53, and stores the data in the memory 52. This data is for example the upper limit data and return rate data of plural game machines 2 under the control of the server 1, that is, information sent from each game machine 2 under the control of the server 1. The CPU 51 reads a program stored in the database 54 on the memory 52, and progresses the program based on the information sent from each game machine 2 that is stored in the memory 52. The progress of the program is stored in the database 54.

[Operation of Game Machine]

It is assumed in the following, for purposes of description, that the game machine 2 is activated in advance, and flags and variables are initialized to a predetermined value.

Figure 6:
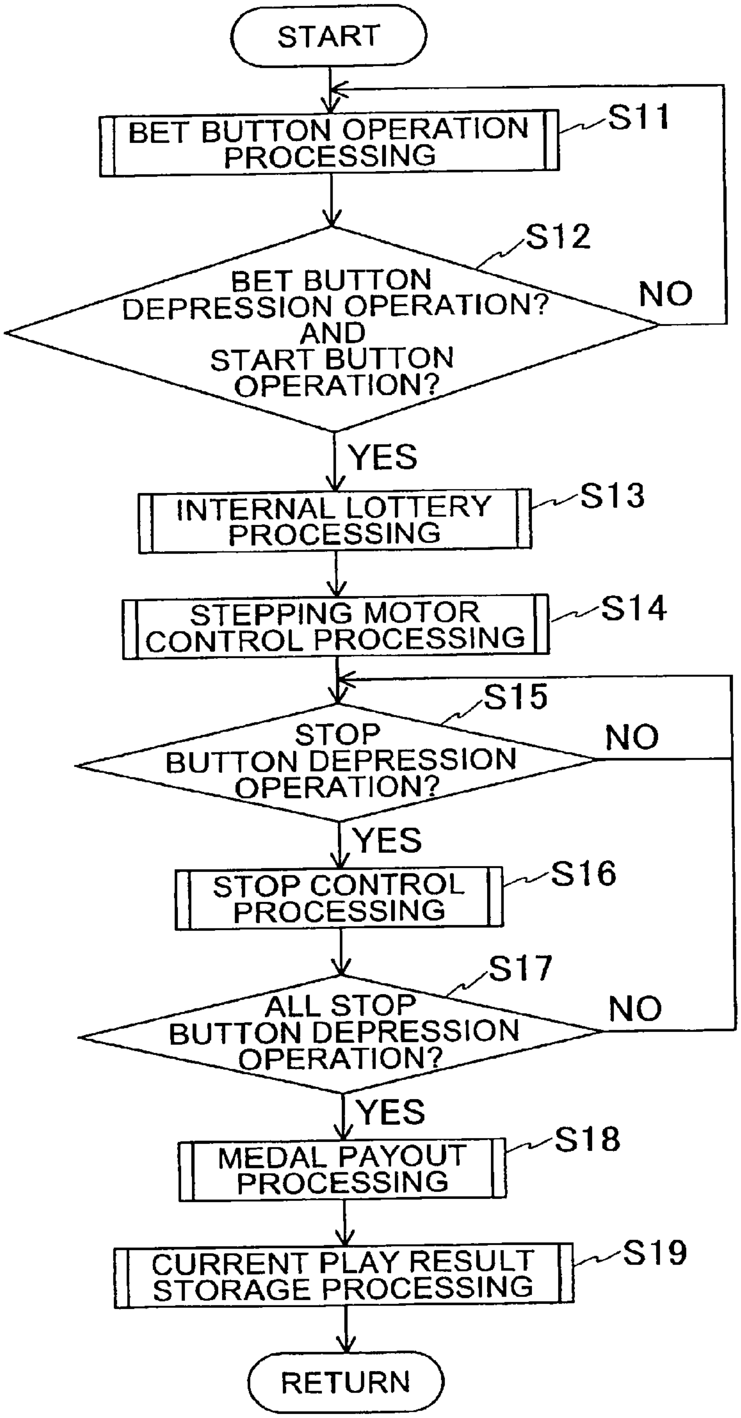
FIG. 6 is a flowchart showing the flow of control of the game machine.

FIG. 6 is a flowchart showing the flow of control of game machines. Referring to FIG. 6, firstly, the CPU 33 with the game machines 2 judges whether the bet button 16 is depressed by the player (step S1). The bet-button operation processing is executed in accordance with the operation of depressing the bet button 16, and includes the following processing: (i) detecting whether an operation signal is issued from the bet button 16 in response to an operation to the bet button 16, thereby storing the number of throw-in medals with the operation; and (ii) issuing a drive signal to the bet line indicator lamp 13, in order to indicate the bet line that becomes effective in accordance with the number of throw-in medals.

Upon completion of the bet-button operation processing, the CPU 33 judges whether the pressing operation of the bet button 16 is performed and the operation of the start lever 17 is performed (step S12). When the CPU 33 judges both operations are performed, the CPU 33 moves the processing to step S13. When the CPU 33 judges both are not performed or none of these operations are performed, the CPU 33 returns the processing to step S11, and performs the bet-button operation processing again. Note that a period of time that all the drums 5A to 5C are started in rotation and are brought into a stop is a sequence of game (play).

Move to the processing of step S13, the CPU 33 executes an internal lottery processing. The internal lottery processing includes processing of: (i) controlling the random number generator 38 to generate a random number; and (ii) searching data group indicating the correspondence between combinations of symbol marks and random numbers, thereby deciding a combination of symbol marks in accordance with the generated random number. The combination of symbol marks stopped and displayed on the previous game is stored in the RAM 37. In the following game, the CPU 33 reads the combination of symbol marks stored in the RAM 37, so that it is used for internal lottery processing.

Although the first preferred embodiment employs the style of using the internal lottery processing in order to control the player's game status (play status), there may be employed such a style that the player is allowed to enter an advantageous game status depending on the actually stopped symbols, without performing the internal lottery.

In the internal lottery processing, a combination of symbol marks that can be stopped and displayed is determined by lottery, and a value indicating the lottery result is substituted for a lottery data of the currently performing game (current game lottery data). For instance, when it is in the disabled prize-winning status and in failure pattern, the current game lottery data is set to "00". When it is in the disabled prize-winning status and there occurs the symbol marks combination matching with a small prize pattern, the current game lottery data is set to "01". When it is in the enabled prize-winning status, the current game lottery data is set to "12". When it is in the special play status and in failure pattern, the current game lottery data is set to "20". When it is in the special play status and there occurs the symbol marks combination matching with a small prize pattern, the current game lottery data is set to "21".

Upon completion of the processing of step S13, the CPU 33 reads a subroutine about stepping motor control processing (not shown) and issues, based on the subroutine, control signals to the stepping motors 11A to 11C, in order to drive each motor at a predetermined rotational speed (step S14). The term "rotational speed" means a speed at which the symbol marks are changeably displayed by the rotation of the drums 5A to 5C in the above-mentioned sequence of game (play). That is, any speed in the transient rotation state, for example, immediately after the drums 5A to 5C starts rotation and immediately before they are brought into a stop, are excluded from the concept of the rotational speed.

In the first preferred embodiment, there is a lottery data of the game performed in the past that corresponds to the above-mentioned current game lottery data. The past game lottery data is data indicating the lottery result of the game performed before the current game, and the data is stored in the RAM 37. In the normal game to which the game style moves when the special game is over, the past game lottery data is reset at the time of performing the fast game. The past game lottery data is updated by sequentially accumulating the current game result in the previous game result.

Upon completion of the above-mentioned stepping motor control processing, the CPU 33 judges whether the player depressed any one of the stop buttons 18A to 18C in order to stop the drums 5A to 5C, and from which stop button a stop signal is issued (step S15). When the judgment result is that no stop signal is issued from the stop buttons 18A to 18C, the CPU 33 executes again the processing of step S15. When the judgment result is that a stop signal is issued from any one of the stop buttons 18A to 18C, the CPU 33 performs processing for stopping the stepping motors 11A to 11C (step S16). This stepping motor stop control processing includes: (i) controlling the random number generator 38 to generate a random number; and (ii) searching data group indicating the correspondence between combinations of symbol marks and random numbers, thereby deciding a combination of symbol marks in accordance with the generated random number.

The CPU 33 obtains a symbol mark currently appearing on the windows 8A to 8C, based on (i) a rotational position signal issued from the rotational position sensors 34A to 34C; and (ii) a standard position signal issued from the standard position sensors 35A to 35C. Based on (i) the above-mentioned symbol mark data, and (ii) the current game lottery data set in the above-mentioned internal lottery processing (step S13), the CPU 33 controls the stepping motors 11A to 11C and decides a stop position.

Although the CPU 33 stops the stepping motors 11A to 11C in accordance with the current game lottery data, if decided that any one of the stop buttons 18A to 18C is depressed, the CPU 33 can apply an additional drive to the stepping motors 11A to 11C, under prescribed conditions Concretely, when any symbol mark corresponding to the current game lottery data cannot be stopped and displayed, the stepping motors 11A to 11C are subject to an additional drive in the range of the maximum amount of four symbol marks. In this connection, if any symbol mark corresponding to the current game lottery data is not present in that range, it is impossible to stop and display any symbol mark corresponding to the current game lottery data. For instance, even when in the enabled prize-winning status, two drums are already stopped and there is a symbol mark(s) allowing for match with a winning pattern, whether the player obtains the winning pattern depends on the timing at which the player operates the stop button corresponding to the last drum to be stopped. On the other hand, when in the disabled prize-winning status, two drums are already stopped and there is a symbol mark(s) allowing for a winning pattern, the stepping motors 11A to 11C are controlled so as not to provide a match with the winning pattern, irrespective of the timing of operation of the stop button corresponding to the last drum to be stopped.

Upon completion of the above-mentioned stepping motor stop control processing, the CPU 33 judges whether all the stop buttons 18A to 18C are depressed (step S17) In other words, in the judge processing of step S17, it is judged whether there are detected all the stop signals issued in accordance with the depressing operation to the stop buttons 18A to 18C. In this connection, when the judgment result is that all of the stop buttons 18A to 18C are not operated, the CPU 33 returns the processing to step S15. When the judgment result is that all the stop buttons 18A to 18C are operated, the CPU 33 moves the processing to step S18.

Moving to the processing of step S18, the CPU 33 judges whether a combination of symbol marks aligned on the line that becomes effective matches with a winning status, and pays out game medals corresponding to the winning status (step S18). In this medal payout processing, the judgment result is that the combination of symbol marks aligned in the effective line and the wining state are each matched, the CPU 33 calculates the number of payout medals corresponding to the winning status, and payouts the number of medals corresponding to the calculated number. Thereafter, the CPU 33 moves the processing to step S19. On the other hand, when the judgment result is that the combination of symbol marks aligned in the effective line and the wining state are not matched, the CPU 33 moves the processing to step S19, without executing any medal payout.

Moving to the processing of step S19, the CPU 33 mainly stores the current game lottery data (step S19). In the first preferred embodiment, the processing for storing the current game result is terminated at the time that the CPU 33 reads a past game lottery data from the RAM 37 and stores the current game lottery data together with the past game lottery data in the RAM 37.

[Flow of Operation of Game Machine]

Figure 7:
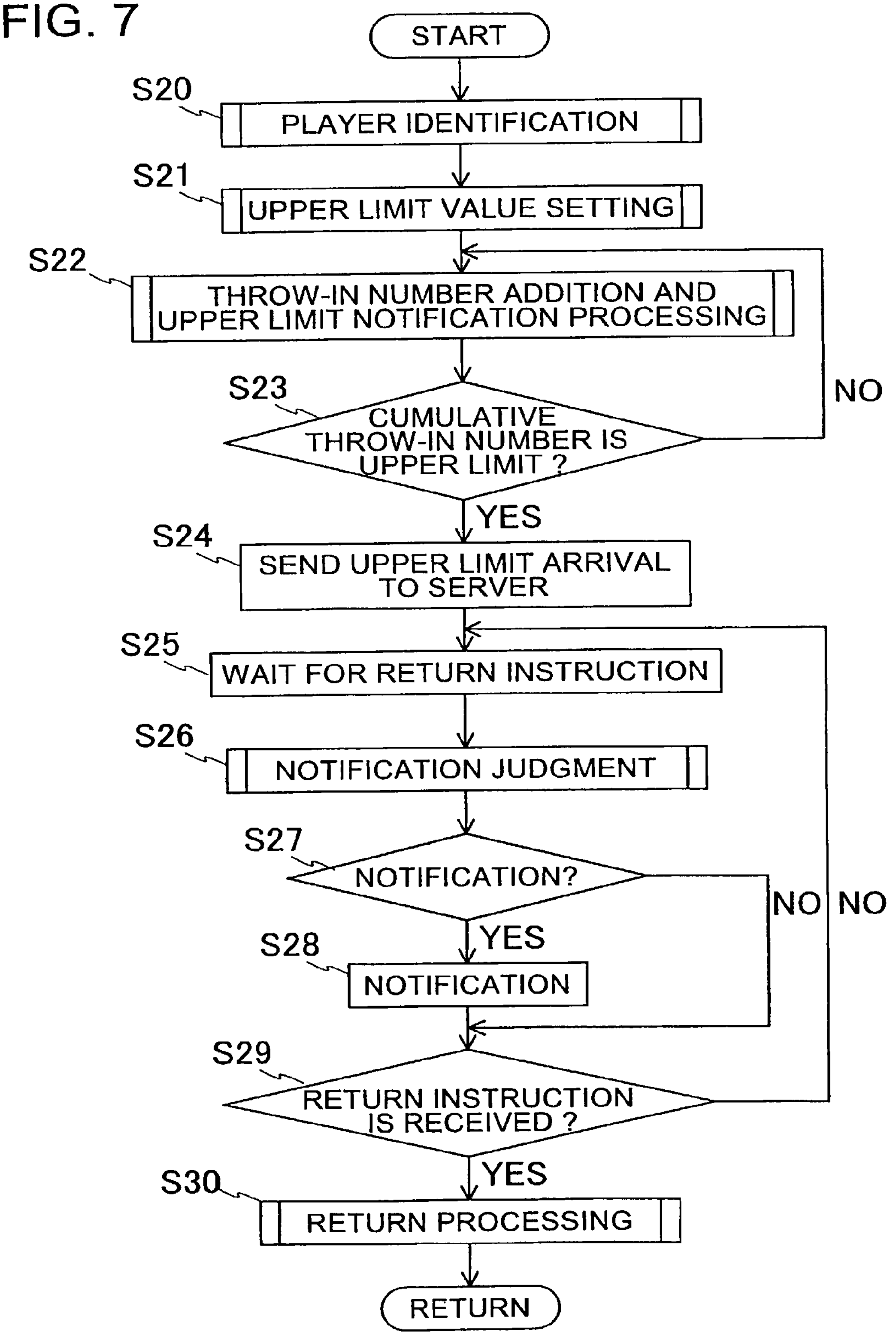
FIG. 7 is a flowchart showing the flow of operation of the game machine.

FIG. 7 is a flowchart showing the flow of operation of game machines. The procedure shown in this flowchart is performed concurrently with the subroutine of the game machines 2 shown in FIG. 6.

Referring to FIG. 7, the game machine 2 discriminates the player (step S20). This player discrimination processing is executed by the CPU 33 with the game machine 2, in order to judge as to: (i) whether a game is being performed on the game machine 2; (ii) who the player is, if the game is performed on the game machine 2; and (iii) whether he/she is the same or different from the previous player.

The reason why the player discrimination processing is particularly necessary is that a return is executed per player in the first preferred embodiment, unlike the conventional game machine executing a return per game machine. That is, when there is a player change, the game (play) status about the upper limit till then is reset. It is therefore necessary to detect a player change and discriminate the player.

Figure 8:
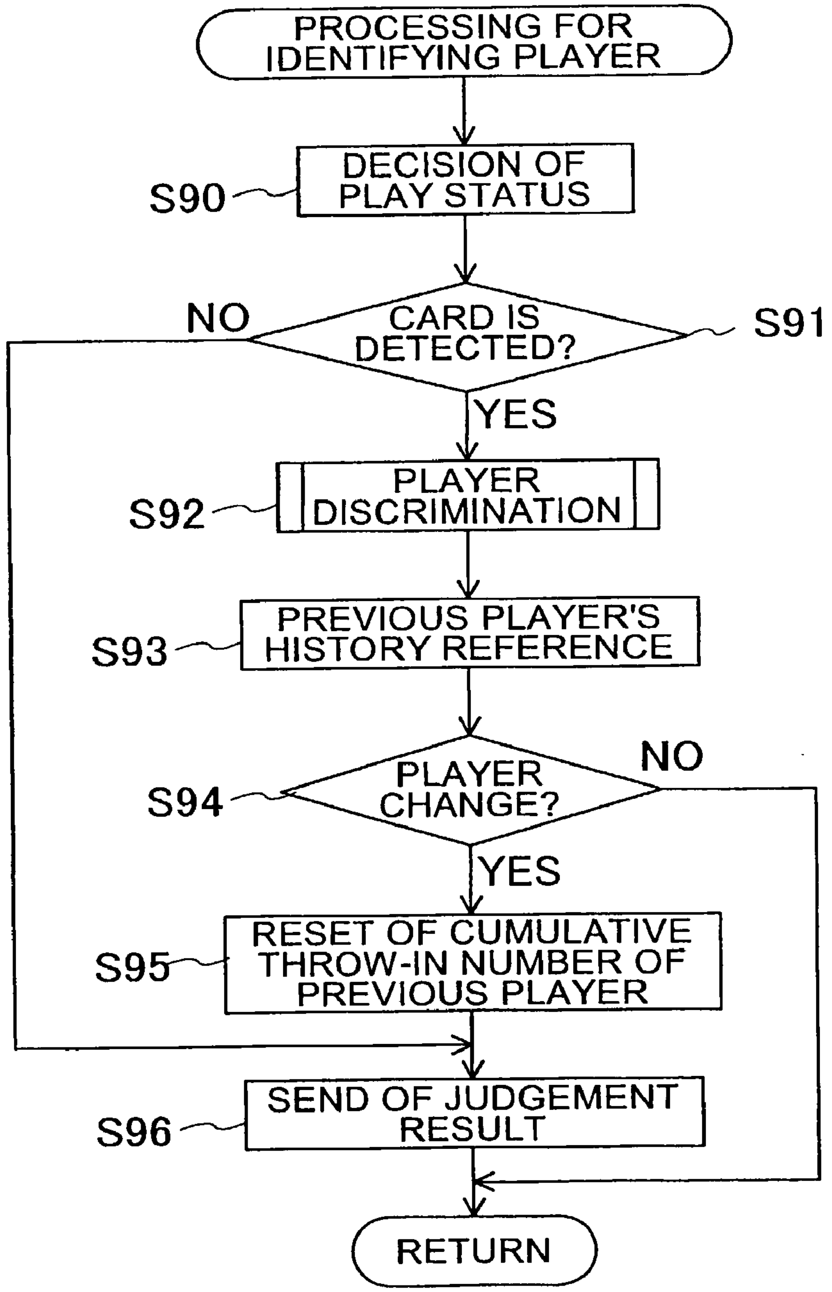
FIG. 8 is a flowchart showing the flow of operation of the game machine when performing a player identification process.

FIG. 8 is a flowchart showing the flow of operation when a game machine discriminates the player. This flowchart corresponds to the subroutine of the player discrimination processing (step S20) shown in FIG. 7.

Referring to FIG. 8, firstly the CPU 33 with game machine 2 judges play status (step S90). The play status judgment is processing for judging whether there is a player performing a game on the game machine 2 (i.e., whether a game is being performed on the game machine 2). When the game machine 2 is not in play status, the following processing is unnecessary. It is therefore necessary to firstly check whether the game machine 2 is in play. The play status judgment is achieved by detecting whether a card is inserted into the card inlet 22 provided on the front panel 4 of the game machine 2.

In order to check the play status, the CPU 33 judges whether a card is detected (step S91). This card detection is achieved by detecting whether a card is inserted into the card inlet 22 with the card reader 23. The card to be inserted is an identification card storing information to identify the player, which can have any function other than identification. For example, a prepaid card storing information to identify the player can be used.

In the judgment processing of step S91, the card detection is performed. When the judgment result is that no card is inserted, the CPU 33 terminates the player discrimination processing. Thereafter, the CPU 33 with the game machine 2 sends the server 1 a signal of discrimination result that no card is detected (step S96). As the contents of signals related to the card detection, for example, data "0" is sent when no card is detected, and data "1" is sent when a card is detected.

On the other hand, when the judgment result is that a card is inserted, the CPU 33 identifies the player performing a game on the game machine 2 (step S92). If a card is already inserted, the card reader 23 reads information stored in the card. In the first preferred embodiment, the card inserted in the card inlet maintains identification number data individual to the player, in order to identify the player. Therefore, the CPU 33 with the game machine 2 can identify the player playing a game on the game machine 2, based on the identification number data.

Upon completion of the above-mentioned player identification processing, the CPU 33 refers to the previous player's history (step S93). Information of the players who have been played on the game machine 2 is stored, as history, in the RAM 37 of the game machines 2. The CPU 33 refers to the player's history stored in the RAM 37, and refers to the identification number of the player immediately before receiving a signal indicating that a card has been detected.

Based on the result of reference to the immediately-before player' history, the CPU 33 judges whether there is player change (step S94). The CPU 33 compares (i) the identification number data of the previous player that has been referred to in step S93; with (ii) the identification number data of the player that has been sent from the card reader 23 together with the card detection signal, thereby judging whether there is agreement between the two. If the two data agree, the CPU 33 judges that there is no player change, because the same player merely inserted the identification card again. If the two data are different, the CPU 33 judged that there is player change. In the absence of no player change, the CPU 33 completes the player discrimination processing. On the other hand, in the presence of player change, the CPU 33 resets the cumulative throw-in number of the previous player (step S95). Concretely, the CPU 33 resets data related to the cumulative throw-in number of credit consumed by the previous player, in the player's history stored in the RAM 37 that has been referred to in step S93.

This reset processing is for implementing one of the characteristic features of the first preferred embodiment, that is, performing a "return" per player. This means that the cumulative throw-in number of credit cannot be increased by addition to the credit number thrown by the other player. Therefore, if a certain player stops a game on one game machine before reaching the upper limit of the cumulative throw-in number of credit, and moves to the other game machine, this player will start a game on the other game machine from the status that the cumulative throw-in number of credit returns to "0". Thereby, the player might not often change game machines. In addition, the player is aware that there is a high probability of return when reaching the upper limit of the cumulative throw-in number. Because of this the player may continue the game without anxiety.

Upon completion of the above-mentioned reset processing, the CPU 33 with the game machine 2 sends the result of judgment made in step S90 (step S96). Concretely, the CPU 33 sends the player's information to the server 1 via the communication interface circuit 41, network NT, and communication interface 53 of the server 1. Data to be sent may be the player's information to which value "1" is appended, as stated above. At this time, in the game machine 2, the past player's history information stored in the RAM 37 is rewritten to the new player's information and then stored.

Upon completion of the above-mentioned data sending processing, the CPU 33 repeats the player discrimination processing.

Although in the first preferred embodiment, an identification card storing data to verify the player or an ID card is used as means for discriminating the player, the following means are applicable. For example, a human sensor to detect human body may be attached to the game machine 2. To a stool on which the player sits for performing a game, the function of weighing may be added for weighing and storing the player's body weight, thereby discriminating the player.

Referring again to FIG. 7, upon completion of the above-mentioned sequence of player discrimination processing, the CPU 33 with the game machine 2 sets an upper limit value that is a standard for return (step S21). The upper limit value is the number of medals, as a game medium, which is used for performing a game on a slot game machine etc. When the number of medals used by a certain player reaches the upper limit value, the slot game machine executes a return to this player.

The above-mentioned upper limit value setting is attainable in the following various instances: (i) the upper limit setting is performed by using a preset upper limit value; (ii) the owner of the game machine performs the upper limit setting; or (iii) the upper limit value is automatically changed depending on the play status. The upper limit value setting executable in the above various instances should be performed when the game player of the game machine 2 is changed, and without failing to refer to the result of judgment whether there is a player change in step S21. The result of judgment whether there is the player change is made into data and sent from the server 1 to the game machine 2. Concretely, in the presence of the player change, data to which value "1" is appended is sent. On the other hand, in the absence of the player change, data to which value "0" is appended is sent.

Following is the instance of using a preset upper limit value, which is one of the above-mentioned various instances. The preset upper limit value is stored in the RAM 37. The CPU 33 reads data of the upper limit value from the RAM 37 and completes setting of the upper limit value. The instance of setting the upper limit value without using the preset upper limit value will be described hereafter.

Upon completion of the above-mentioned upper limit value set processing, the CPU 33 performs, based on the result of the bet button operation processing (step S11) shown in FIG. 6, processing for (i) adding the number of medals thrown by the player as a game medium; and (ii) notifying the upper limit (step S22).

A description of throw-in number addition processing will be presented here. A medal sensor (not shown) provided within the game machine 2 counts medals thrown in through the throw-in slot 15. The counted number data is added to a cumulative throw-in number data, which is data of medals thrown in the past, and stored as a current throw-in medal data. Hereinafter, the cumulative consumption of credit is referred to as a "cumulative throw-in number of medals."

The above-mentioned cumulative throw-in number data is data stored in the RAM 37. The CPU 33 executes the following processing for: (i) reading data of the past throw-in medal from RAM 37; (ii) adding data of the current throw-in medal counted by the medal sensor to data of the cumulative throw-in number; and (iii) storing the result of addition as updated cumulative throw-in number data in the RAM 37. The cumulative throw-in number data is reset in the presence of player change, as previously described in the player discrimination processing (step S20).

A description of upper limit notification processing will be next presented. The upper limit notification means to notify the player how soon the game machine 2 can reach the upper limit. Specific contents of the notification include: (i) the set upper limit value; (ii) the current cumulative throw-in number; or (iii) the rate of the cumulative throw-in number to the upper limit value (i.e., one that is expressed by percentage how close to the upper limit).

In the absence of such a notification, a player will continue a game without being informed of when the game machine that the player is performing the game reaches the upper limit. This increases the player's anxiety. Then, if the upper limit value is notified, the player can know to what extend he/she has to perform a game up to the upper limit. At the result, the player can continue the game without anxiety. Therefore, it is desirable to perform un upper limit notification in the first preferred embodiment.

Upon completion of the above-mentioned throw-in medal number addition processing and upper-limit notification determination processing, the CPU 33 judges whether the cumulative throw-in number reaches the upper limit (step S23). This judgment is achieved by comparing (i) the cumulative throw-in number data that was stored in the RAM 37 in the processing of step S22; and (ii) the upper limit value that was set in the processing of step S21. Concretely, the CPU 33 compares these two data stored in the RAM 37 and judges whether the number of medals that the play throws in the game machine 2 reaches the upper limit. When the judgment result is that the cumulative throw-in number does not reach the upper limit value, the CPU 33 returns the processing to step S22, and continues processing for adding the number of medals that the player throws in the game machine 2. On the other hand, when the judgment result is that the cumulative throw-in number reaches the upper limit value, the CPU 33 sends the result (arriving at the upper limit) to the server 1 (step S24). Concretely, the CPU 33 with the game machine 2 sends (i) a signal indicating that the cumulative throw-in number reaches the upper limit value; (ii) data of the upper limit value set in the processing of step S21; and (iii) data of return rate, to the server 1 via the communication interface circuit 41 of the game machine 2.

More specifically, the signal indicating arrival at the upper limit is expressed for example by numerical value of "1". To the signal indicating that the cumulative throw-in number reaches the upper limit, a signal designating the game machine 2 is appended (i.e., data indicating to which of plural game machines under the control of the server 1 the game machine 2 corresponds). For example, if an identification number, the numbers "123", is assigned to the game machine 2 among plural game machines under the control of the server 1, a signal of "123-1", wherein the numerical value "1" as the signal indicating arrival at the upper limit is affixed to the identification number "123" of the game machine 2, is sent to the sever 1.

The upper limit value data is stored in the RAM 37, as described above. This upper limit value data is used for determining the number of return medals on the occasion where a return must be executed to the player. The number of return medals is calculated by multiplying the upper limit value by a return rate.

The RAM 37 with the game machine 2 stores return rate data for determining to what extent the return must be executed with respect to the upper limit value of the game machine 2. This return rate data is sent to the server 1.

The above-mentioned return rate is usually a preset numerical value. It is however possible to change the return rate in various forms, thereby increasing the game characteristics. Processing for changing return rate will be described later.

Upon completion of the upper-limit-arrival result sending processing to the server 1, the CPU 33 with the game machine 2 waits for a return instruction (step S25). The return instruction is a signal to be sent from the server 1 to the game machine 2 of which cumulative throw-in number data reaches the upper limit, and this signal is used for controlling the timing of return etc. The game machine 2 remains in the enabled play state even while waiting for the return instruction.

In the above-mentioned return instruction waiting status, the CPU 33 judges whether notification should be executed or not (step S26). The term "notification" means to notify that a return will be executed from now to the player of the game machine 2.

By referring to the data stored in the RAM 37, the CPU 33 determines as to whether this notification should be executed (step S27). The RAM 37 stores data for determining execution of notification. Concretely, data of "1" is assigned for execution of notification, and data of "0" is assigned for no execution of notification. These data may be preset or set properly by the owner of the game machine etc.

When the data stored in the RAM 37 is "1", the CPU 33 notifies the player the content that the cumulative throw-in medal number of the game machine 2 on which he/she is performing a game will reach the upper limit thereby to execute a return shortly (step S28). This notification may be executed by using an illuminator provided within the game machine 2. Alternatively, the game machine 2 may have a display part performing notification to the player. Any notification means capable of giving the player a previous notice of return may be employed, whether it be provided unitary with the game machine 2.

When the above-mentioned notification processing is completed, or when judgment of no notification is executed, the CPU 33 judges whether a return instruction is received (step S29). This return instruction is one that the game machine 2 waits for its arrival from the server 1 in the processing of step S25. The server 1 sends this return instruction without fail to a game machine 2 employing the style that a return is executed every time the game machine 2 reaches the upper limit, as well as a game machine 2 employing the style that a return is not always executed to the game machine 2 when it reaches the upper limit.

The server 1 sends a return instruction signal at a predetermined timing to the game machine 2 via the communication interface 53. In the game machine 2, the CPU 33 receives the return instruction via the communication interface circuit 41 and input/output bus 32. If failed to receive the return instruction, the CPU 33 returns the processing to step S25, and waits for the return instruction again.

Upon completion of the above-mentioned return instruction receiving processing, the CPU 33 executes return processing (step S30). This return processing is executed based on the return instruction issued from the server 1 in step S29. Concretely, the CPU 33 receives data that indicates to what extent the return should be executed to the game machine 2, and executes a return based on the received data.

In the game machine 2 employing the style that a return is executed every time the throw-in medal number reaches the upper limit, a number of medals are returned which is calculated mainly based on the upper limit data and return rate data stored in the RAM 37. On the other hand, in the game machine 2 employing the style that a return is not always executed when the throw-in medal number reaches the upper limit, if decided to execute no return, the throw-in number data stored in the RAM 37 is reset as required. This throw-in number data reset is executed under a program stored in the ROM 36, based on an instruction of the CPU 33.

Upon completion of the above-mention return processing, the CPU 33 moves again the processing to the upper-limit value setting processing (step S21), and repeats the above-mentioned sequence of processing.

[Flow of Return Preparation Operation of Game Server]

Figure 9:
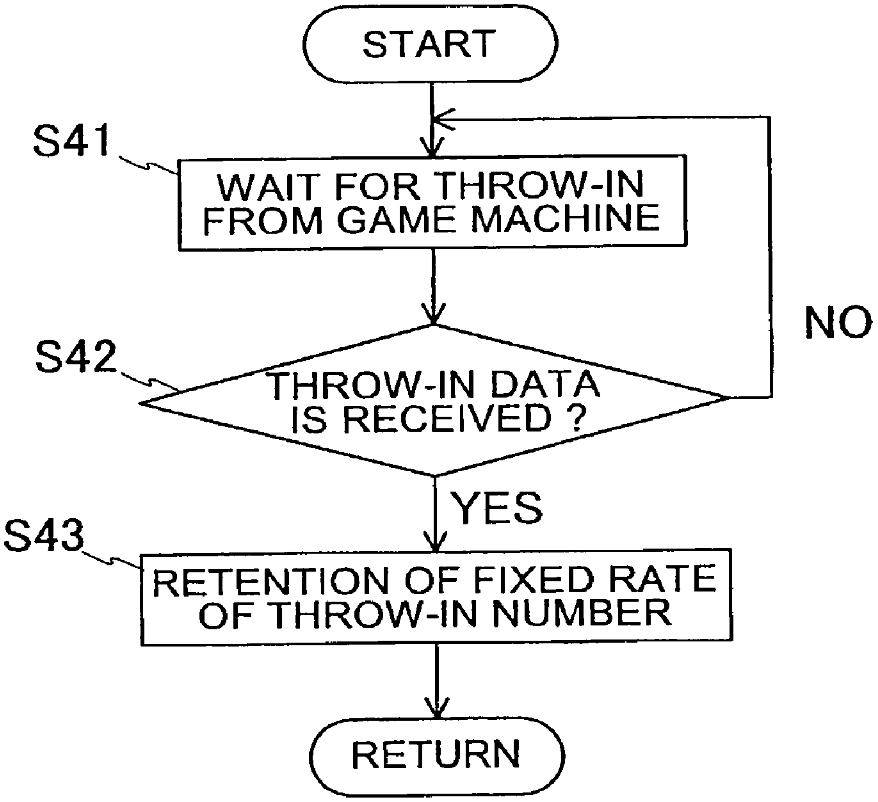
FIG. 9 is a flowchart showing the flow of operation when the game server makes preparation for return.

FIG. 9 is a flowchart showing the flow of operation when the game server makes preparation for return. This operation is always repeated in the server 1.

The server 1 always holds some of medals serving as a game medium, which have been thrown in each game machine 2, in preparation for execution of return to the game machine 2 under the control of the server 1 reaches the upper limit.

Referring to FIG. 9, the server 1 is waiting for the game medium throw-in result from each game machine 2 (step S41). As the game medium that the player uses on each game machine 2, it is possible to use any tangible matters, e.g., medals, winning balls, or coins, each being used generally. Besides these, any intangible matters that can be expressed in numerical value as data are also handled as a game medium in this preferred embodiment. The term "throw-in" means the following action that a certain player makes a game machine recognize the game medium for the purpose of playing a game, irrespective of the type of the game medium. Therefore, not only a medal etc. that is thrown in through the throw-in slot 15 and detected by the medal sensor of the game machine 2, but also numerical value data etc. that the player decides to use for game becomes a candidate for wait.

In the status that the server 1 is waiting for throw-in of a game medium, the CPU 51 with the server 1 judges whether game medium throw-in data is received at a predetermined timing (step S42). In this preferred embodiment, medals are used as the game medium, and the player continues the game on the game machine 2, while throwing in medals via the throw-in slot 15. The number of thrown-in medals is detected by the medal sensor within the game machine 2. The detected number is made into a numerical value as data. This data is then stored in the RAM 37 of the game machine 2, as cumulative throw-in number data. This cumulative throw-in number data is sent at a predetermined timing to the server 1 via the communication interface circuit 41. The server 1 receives this cumulative throw-in number data via the communication interface 53. The received cumulative throw-in number data is properly stored in the memory 52, based on an instruction of the CPU 51. In the judgment processing in step 42, if the server 1 fails to receive the throw-in data, the CPU 51 returns the processing to step S41.

Upon completion of the throw-in data receiving judgment processing, the CPU 51 holds a predetermined percent of the throw-in number (step S43). As stated above, the server 1 is constructed so as to bold in advance the game medium for return to the player performing a game on each game machine 2 under the control of the server 1. The hold amount differs from one server to another. The hold amount is determined by multiplying the cumulative throw-in number data of each game machine 2 that the server 1 receives in the processing of step S42, by a predetermined rate (return rate).

In the above-mentioned hold processing, the server 1 sends a numerical value data corresponding to the hold amount calculated by the CPU 51, to the game machine 2 via the communication interface 53. Based on the received numerical value data, the CPU 33 with the game machine 2 directs the RAM 37 to store, as hold data, a numerical value data that is part of the cumulative throw-in number data.

Upon completion of the above-mentioned hold processing, the server 1 returns to the status of waiting for throw-in data from each game machine 2 (step S41), and repeats the foregoing sequence of processing.

[Flow of Return Operation of Game Server]

Figure 10:
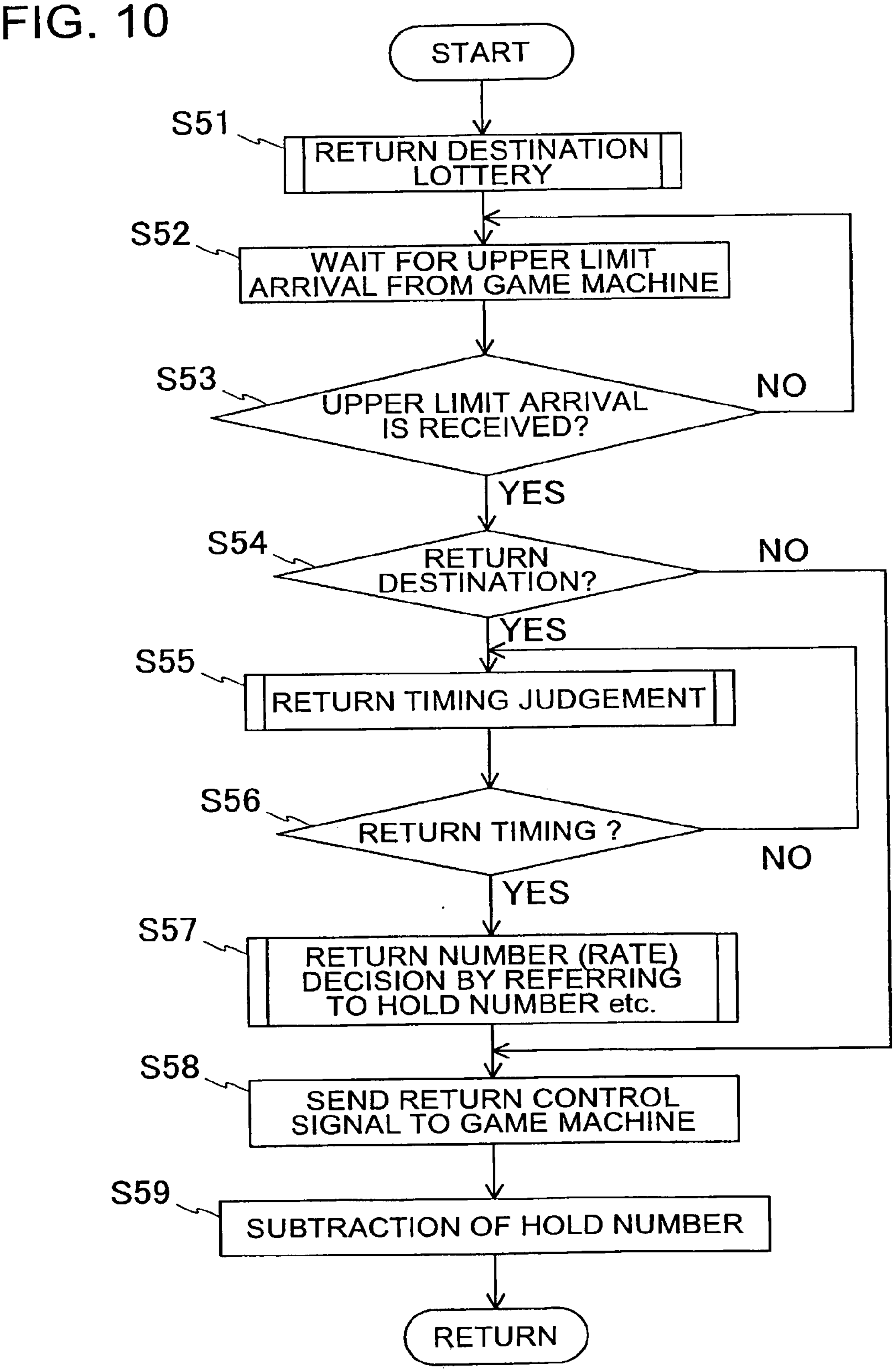
FIG. 10 is a flowchart showing the flow of operation when the game server executes a return.

FIG. 10 is a flowchart showing the flow of operation when the game server executes a return. This operation is always repeated.

Referring to FIG. 10, firstly, the CPU 51 with the server 1 performs a lottery for determining a return destination (step S51). This return destination lottery is mainly performed to the case of taking the style that a return is not necessarily executed to the game machine 2 reaching the upper limit. As the lottery manner, there are for example: (i) "a return is executed to a game machine that will be the N-th to reach the upper limit"; and (ii) "a return is executed to a game machine, the end of which machine-number meets a lottery-number." Whereas in the case of taking the style that a return is always executed to the game machine reaching the upper limit, the result obtained by lottery can be exemplified as follows: (i) "a return is executed to the first game machine which will reach the upper limit; and (ii) "a return is executed to game machines having machine numbers with the last digit of 0, 1, . . . , or 9 (i.e., to designate all the machine-numbers)." These lottery results are stored in the memory 52, based on an instruction of the CPU 51.

Upon completion of the above-mentioned return destination lottery processing, the CPU 51 with the server 1 waits for the upper limit arrival result sent from each game machine 2 (step S52). As stated above, this upper limit arrival result indicates that the game medium thrown in the game machine 2 reaches a preset amount. Upper limit arrival judgment is made on the game machine 2. When the judgment result is the arrival of the upper limit, this result is sent to the server 1 waiting for the upper limit arrival result via the communication interface 53.

When the server 1 is waiting for the upper limit arrival result, the server 1 judges whether it received the upper limit arrival result at a predetermined timing (step S53). The CPU 51 executes this judgment. When the judgment result is that the upper limit arrival result is received, the CPU 51 moves the processing to the step S54. On the other hand, the judgment result is that no upper limit arrival result is received, the CPU 51 returns to the upper limit arrival result wait processing (step S52), and repeats judgment of the receipt of the upper limit arrival result at the predetermined timing.

Moving to the processing of step S54, the CPU 51 judges whether the game machine 2 sending the upper limit arrival result is a return destination. This judgment is executed, based on the data determined by the data obtained by the lottery performed in the processing of step S51. Thus, the judgment is achieved by a reference to the data stored in the memory 52; and a comparison between this reference data and data affixed to the upper limit arrival result.

For example, when the lottery result is that "a return is executed to a game machine, the end of which machine-number meets a lottery number," as described above, the CPU 51 reads data of the identification number of the game machine 2 that is affixed to the above lottery result, and then judges whether the end of the identification number meets the above lottery number. In the case of taking the style that a return is always executed for the upper limit arrival, a positive result is always obtained in the judgment whether it is the return destination.

In the above-mentioned return destination judgment processing, when the judgment result is negative, a signal indicating no execution of return is sent in the processing for sending a return control signal that will be described later. This signal is sent to the game machine 2 via the communication interface 53, based on an instruction of the CPU 51. If a positive result is obtained, the CPU 51 judges a return timing (step S55).

The return timing can be set variously. For example, to the game machine reaching the upper limit and being the return destination, a forced return may be executed immediately after the completion of all the processing on the server 1. Alternatively, a return may be executed after an elapse of a predetermined period of time from the completion of all the processing on the server, or after performing a predetermined number of games.

The processing for judging a return timing is to judge at which timing a return should be executed. If a return timing is predetermined uniquely, this return timing is employed.

Upon completion of the above-mentioned return timing judgment processing, the CPU 51 judges whether a return timing is established (step S56). The term "return timing" is one that is determined in the processing of step S55, this return timing is stored in the memory 52 of the server 1. For instance, if provided a temporal timing such as "at a few minutes after the upper limit arrival," a timer (not shown) within the server 1 is used to control this timing. If provided a timing based on the player's game circumstances such as "when the player performs twenty games after reaching the upper limit," various sensors within the game machine 2 are used to judge whether predetermined conditions are satisfied. When the conditions are satisfied, a signal indicating this timing is sent from the CPU 33 with the game machine 2 to the server 1.

When the judgment result is that because return processing is started after the return timing, such timing is not yet established, the CPU 51 returns the processing to step S55, and repeats the processing from step S55. On the other hand, when the judgment result is that the return timing is established, the CPU 51 determines the amount of return by referring to the hold game medium amount (number) etc. obtained in the processing of step S43 (step S57).

The amount of return to the game machine 2 is managed by the hold game media hold in the processing of step S43. Arriving at the upper limit, a return is usually executed by multiplying the upper limit by a preset return rate. As a general rule, the server 1 calculates the return amount based on the upper limit data and return rate data that are contained in the upper limit arrival result sent from the game machine 2. On the other hand, At the result of the above-mentioned return timing lottery, if there is a prolonged period of time between the upper limit arrival and execution of return, the player waits for return while performing a game. Therefore, it can be considered to increase the return amount depending on the credit number consumed after reaching the upper limit. Also, in the case of taking this style, the server 1 increases the return amount somewhat or increases the return rate slightly in the return amount determination processing (step S57), in consideration of the credit number consumed after reaching the upper limit.

It can also be considered to change the return rate depending on the upper limit value, in order to produce higher game characteristics. In this instance, without using a predetermined return rate, the server 1 that collectively controls a plurality of game machines 2 performs a lottery and changes the return rate properly. A style of producing higher game characteristics by changing the return rate will be presented hereafter.

Upon completion of the above-mentioned return amount determination processing, the CPU 51 with the server 1 sends a return control signal to the game machine 2 (step S58). This return control signal can be classified into two types, according to the result of the above-mentioned return destination judgment processing (step S54). Concretely, with respect to a game machine 2 that was judged as the return destination in the processing of step S54, the value of "1", which is data indicating that this game machine 2 is the return destination, is affixed to part of a return control signal. On the other hand, with respect to a game machine 2 that was not judged as the return destination in the processing of step S54, the value of "0", which is data indicating that this game machine 2 is not the return destination, is affixed to part of a return control signal. In the case of taking the style that a return is always executed to the game machine reaching the upper limit, the value of this return control signal may be set to "1".

The return control signal contains data indicating the degree (amount) of return. All the data contained in this return control signal are sent to the server 1 via the communication interface 53, based on an instruction of the CPU 51.

Upon completion of the above-mentioned control signal sending processing, the CPU 51 with the server 1 subtracts a hold number (step S59). The term "hold number" means the game medium number held in the memory 52 with the server 1, in the processing of step S43 shown in FIG. 9. This hold game medium is used for return to each game machine 2. It is therefore necessary to perform subtract processing of the game medium number data corresponding to the return amount.

The CPU 51 executes this hold amount subtraction processing, and the data of the memory 52 is updated after this subtraction processing.

In the case of changing the return amount to a game machine 2 depending on the play status, there may be configured such that when the return to the game machine 2 is completed, the CPU 33 with the game machine 2 sends the server 1 data indicating the return amount to the player and, when this data is received, subtraction processing is performed.

Upon completion of the above-mentioned hold amount subtraction processing, the CPU 51 with the server 1 returns the processing to step S51, and resumes the processing from the processing of return destination lottery.

[Upper Limit Setting Processing]

The upper limit can be set by a method of using a predetermined upper limit value, or a method of using the upper limit value determined by lottery on the server etc. Since the former method is already described, the latter method will be presented hereafter.

Figure 11:
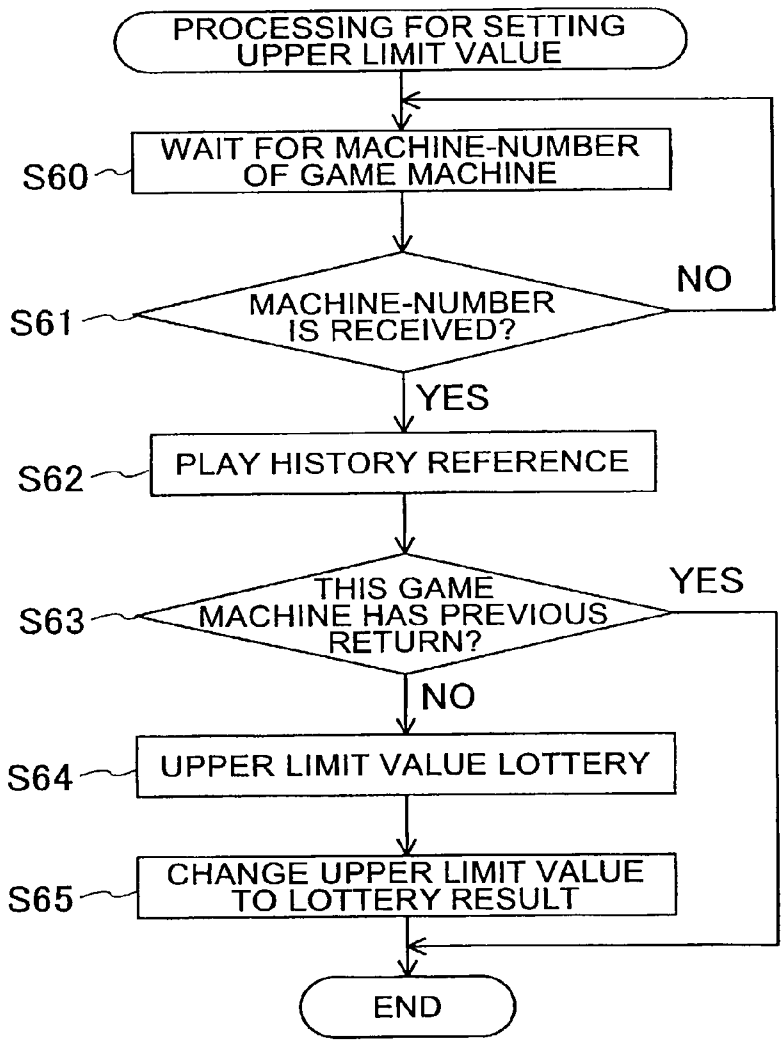
FIG. 11 is a flowchart showing the flow of operation when the game server sets an upper limit value.

FIG. 11 is a flowchart showing the flow of operation when the game server sets the upper limit value. This flowchart corresponds to the subroutine of the upper limit setting processing shown in FIG. 7 (step S21).

Referring to FIG. 11, the server 1 firstly enters the state of waiting for machine-numbers being individual to the game machines 2 under the control of the server 1 (step S60).

As previously described, the server 1 controls the game machine group comprising a plurality of game machines 2. It is therefore necessary to discriminate which one of the game machines 2 attempts to set the upper limit value. Based on an instruction of the CPU 33 with this game machine 2, the game machine 2 attempting to set the upper limit value sends its machine-number to the server 1 via the communication interface circuit 41, network NT, and communication interface 53 with the server 1.

As used herein, the game machine attempting to set the upper limit value can be classified into: (i) a game machine on which the presence of player change is judged in the player discrimination processing (step S20); or (ii) a game machine reaching the upper limit set previously. The game machine-number data is sent together with (i) a signal indicating player change; and (ii) the player's information data. That is, the upper limit setting to the game machine is executed (i) when there is player change; or (ii) when reaching the upper limit set previously.

In the state of waiting for machine-numbers, the CPU 51 with the server 1 judges whether any machine-number is received (step S61). When the judgment result is that no machine-number is received, the CPU 51 returns the processing to step S60, and waits it again. On the other hand, when the judgment result is that a machine-number is received, the CPU 51 refers to a game history (step S62).

As stated above, the flow of the upper limit setting processing corresponds to the subroutine of step S21 shown in FIG. 7. Therefore, the game machine 2 may be subjected to the processing of step S21 for the first time, or come to again step S21 after going through the return processing (step S30).

The game history reference is to know how the game machine 2 reaches the upper limit setting processing (step S21). This is also to prevent dual change of the upper limit value at which the game machine 2 has not yet arrived, because there can be the style of setting an upper limit after executing a return.

The game history is stored in the database 54 with the server 1, and the CPU 51 with the server 1 executes its reference processing. As shown in FIG. 15, this game history stores: (i) the past upper limit values; and (ii) data indicating whether any return has been executed.

Refer of the game history, the CPU 51 with the server 1 judges whether a return has been executed to the game machine 2 at the previous upper limit arrival (step S63).

Data indicating whether a return has been executed is recorded in the column of "the past execution of return" in the return game history, as shown in FIG. 15. Concretely, in the presence of return, data of "1" is given to this column, whereas in the absence of return, data of "0" is given to this column.

When the judgment result is that a return has been executed after the previous upper limit arrival, the CPU 51 judges that a new upper limit value has been set thereafter, and completes the upper limit setting processing. On the other hand, when the judgment result is that no return has been executed after the previous upper limit arrival, the CPU 51 determines an upper limit value by lottery (step S64). This upper limit value lottery is executed by selecting at random one from a certain range of numerical values (e.g., 1 to 200), under a program for upper limit value lottery stored in the memory 52. These numerical values are expressed in thousands of yen, as apparent from an example of data tables related to a game history shown in FIG. 15. For example, when "10" is selected by lottery, the upper limit value is ten thousand yen (¥10,000).

Without limiting to an amount of money, the upper limit value may be represented by for example (i) the medal number assumed to be a game medium; (ii) play time; or (iii) frequency in play (the game number).

Upon completion of the upper limit lottery processing, the CPU 51 with the server 1 changes the upper limit value to the lottery result (step S65). This upper limit value change is executed by recording the new upper limit value in the column of "the upper limit" in the game history of the database 54. This upper limit value is also sent to the game machine 2.

Consider now the instance that the upper limit value is set after a predetermined return is executed.

Figure 12:
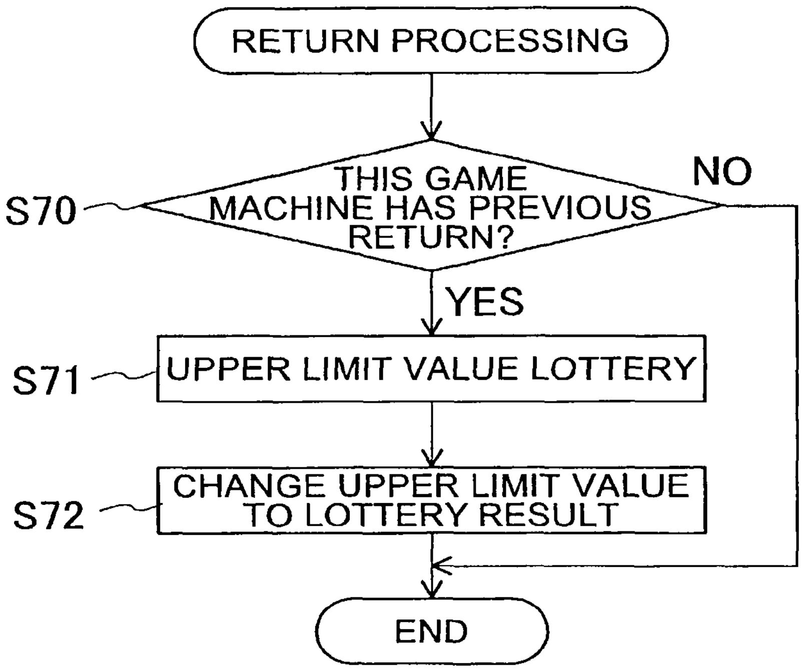
FIG. 12 is a flowchart showing the flow of operation when the game server sets an upper limit value after executing a predetermined return.

FIG. 12 is a flowchart showing the flow of operation when the game server 1 sets the upper limit value after executing a predetermined return. This flowchart corresponds to the subroutine of the return processing shown in FIG. 7 (step S30). That is, the upper limit value setting after executing a return is included in the processing of step S30, as a return processing.

Referring to FIG. 12, the CPU 51 with the server 1 firstly judges whether a return was executed to the game machine 2 (step S70). The presence or absence of return is recorded (stored) in the above-mentioned return history Concretely, data of "1" in the column of "the past return" of the return history indicates that a return has been executed, whereas data of "0" indicates that no return has been executed. When the judgment result is that no return has been executed, in the upper limit setting processing shown in FIG. 7 (step S21), an upper limit value is set based on the subroutine shown in FIG. 11, and therefore the CPU 51 terminates the processing. On the other hand, when the judgment result is that a return has been executed, the CPU 51 determines the upper limit value by lottery (step S71). This upper limit value lottery is executed by selecting at random one from a certain range of numerical values under a program for upper limit value lottery stored in the memory 52.

Upon completion of the above-mentioned upper limit value lottery processing, the CPU 51 with the server 1 changes the upper limit value to the lottery result (step S72). This upper limit value change is achieved by recording the new upper limit value in the column of "the upper limit" of the game history of the database 54. At this time, this upper limit value is also sent to the game machine 2. Thereafter, the CPU 51 terminates the processing of the upper limit value setting after execution of return.

Further, the upper limit value setting can be executed after the player moves to an advantageous status (i.e., after obtaining a big prize). Following is processing for setting an upper limit value after a big prize occurs.

Figure 13:
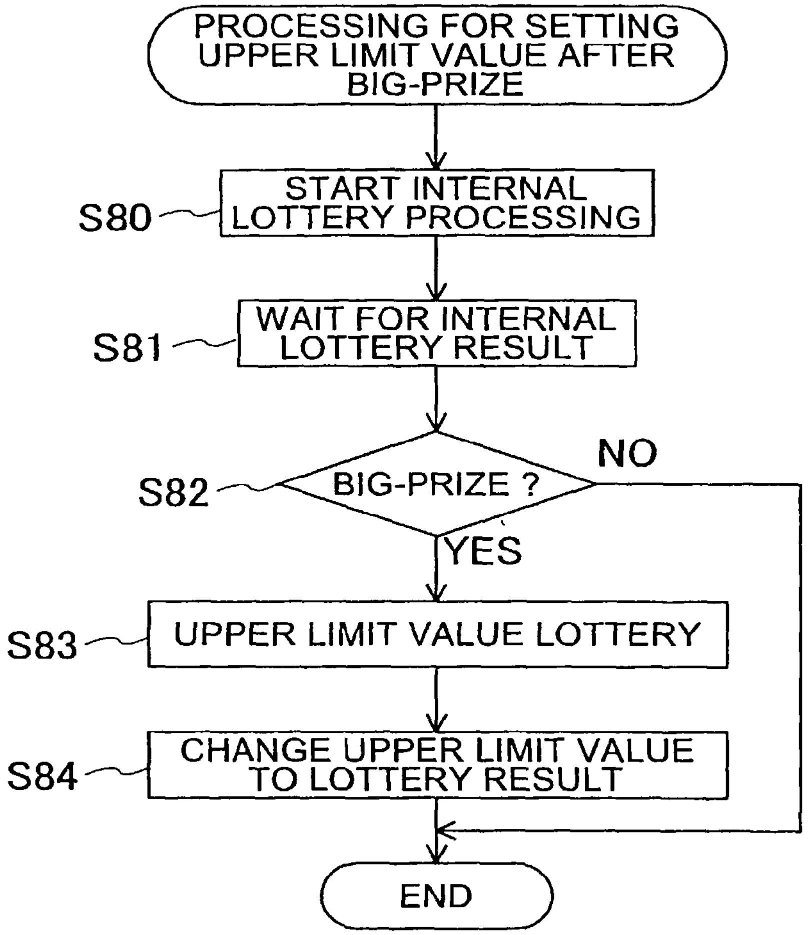
FIG. 13 is a flowchart showing the flow of operation when the game server sets an upper limit value after a big prize occurs on a game machine.

FIG. 13 is a flowchart showing the flow of operation when the game server 1 sets an upper limit value after a big prize occurs on a game machine 2. This flowchart corresponds to the subroutine of the internal lottery processing shown in FIG. 6 (step S13). Although, for convenience in illustration, the flowchart of FIG. 13 is started with the internal lottery processing (step S80), this internal lottery processing is performed in each game machine 2. Therefore, step S81 and later processing are the operations of the server 1.

Referring to FIG. 13, when the internal lottery processing is started, the server 1 enters the state of waiting for the internal lottery result (step S81).

Upon receiving the internal lottery result from the each game machine 2, the CPU 51 judges whether this result is a big prize (step S82). In step S82, the judgment result is that it is not a big prize, the CPU 51 terminates this processing. On the other hand, the judgment result is that it is a big prize, the CPU 51 executes an upper limit lottery (step S83). This upper limit value lottery is executed by selecting at random one from a certain range of numerical values under a program for upper limit value lottery stored in the memory 52.

Upon completion of the above-mentioned upper limit value lottery processing, the CPU 51 with the server 1 changes the upper limit value to the lottery result (step S84). This upper limit value change is achieved by recording the new upper limit value in the column of "the upper limit" of the game history of the database 54. At this time, this upper limit value is also sent to the game machine 2. Thereafter, the CPU 51 terminates the processing of after-big-prize upper limit setting.

As discussed above, the game machine producing higher game characteristics to the player can be provided by properly changing the upper limit value that is a standard for return. In the game machine taking the style of notifying the degree of an upper limit, the next following upper limit value is clearly displayed so that the player can perform a game without anxiety. In addition, if the next upper limit is set at a high value, the player can determine whether be/she continues the game.

[Return Rate Setting Processing]

Figure 14:
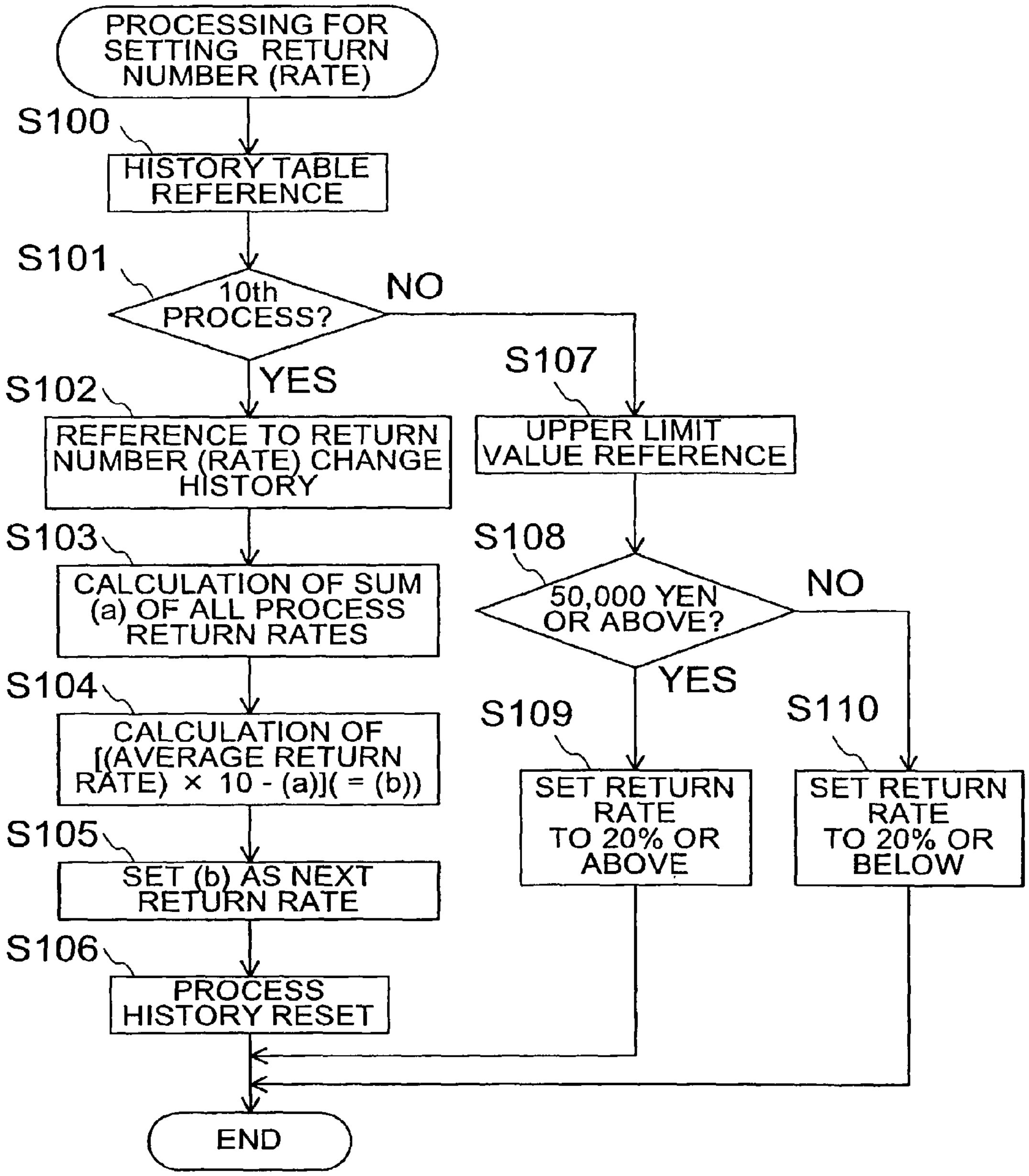
FIG. 14 is a flowchart showing the flow of operation when the game server sets a return rate.

FIG. 14 is a flowchart showing the flow of operation when a server sets a return rate. This flowchart corresponds to the subroutine of the return processing (step S30) shown in FIG. 7.

For setting a return rate, there are for example (i) a method of directly using a return rate preset per game machine; and (ii) a method of changing the return rates of game machines at a predetermined timing. The first preferred embodiment employs the latter method suited for providing players with more thrill.

Referring to FIG. 14, the CPU 51 with the server 1 firstly refers to a game history table (step S100). The game history table indicates the past play circumstances of each game machine 2 that is stored in the database 54 with the server 1. One example of this is shown in FIG. 15. In order to refer to this history table, it is necessary that a game machine 2 send the server 1 a machine-number assigned to the game machine 2. The server 1 reads the machine-number received by the CPU 51, and refers to a history table corresponding to the read machine-number.

Referring to FIG. 15, the following contents are recorded in the game history table, assuming that one process is a term between when a certain value is set as an upper limit value of the game machine 2 and when this upper limit value is changed to other value. The upper limit, return rate, the presence of return, the amount of return, and setting time of return rate are recorded per process. Thus, the server 1 collectively controls the return rates etc. of the game machines 2, and sets a return rate by referring to their respective control histories. On the history table given in FIG. 15, it is assumed that the return rate of the 10th process will be set.

Referring again to FIG. 14, upon completion of the reference processing to the game history table, the CPU 51 with the server 1 judges whether the following is the 10th process (step S101). The return rates of the game machines 2 are set such that the average return rate to be calculated in units of a predetermined number of processes (in 10 processes in the first preferred embodiment) is 40%, which is a percentage of an upper limit value. For example, as shown in the fourth process in FIG. 15, when the upper limit value is 100 (in thousands of yen) and the return rate is 70%, the return amount is 70 (in thousands of yen). In the first preferred embodiment, the aforesaid average return rate, 40%, is for purpose of illustration only and is not to be construed as a limiting value. This is true for the predetermined process number, 10 processes.

Judge that it is the return rate of the 10th process in the game machine 2, the CPU 51 with the server 1 refers to a return rate change history (step S102). The term "return rate change history" is a history of the return rate changes in the respective processes recorded in the column, "return rate." Based on the return rate change history and the average return rate, the return rate of the 10th process is determined. To achieve the reference processing to the return rate change history, the CPU 51 reads the history table stored in the database 54.

Upon completion of the reference processing to the return change history, the CPU 51 with the server 1 calculates the sum (a) of the return rates of the processes that the CPU 51 referred to in step S102 (step S103). For example, in FIG. 15, 10% to the first process, 20% to the second process, . . . and 110% to the ninth process. The sum of the returns rates of the first to ninth processes can be calculated by the expression: 10+20+ . . . +110.

Upon completion of the calculation processing of the return rate sum (a), the CPU 51 with the server 1 calculates term (b), (step S104), by the following expression (1):

$$[(\text{Average Return Rate})\times 10-(a)]=(b) \quad (1)$$

Term (b), a calculation result of the expression (1), is value indicating the return rate set to the 10th process. Concretely, in the first preferred embodiment, the return rates are set such that the average return rate in units of ten processes is 40%. Therefore, the return rate of the 10th process is given by the expression: 40(%)x10−(a).

Upon completion of the term (b) calculation processing, the CPU 51 with the server 1 sets the calculation result (b) as the next return rate (step S105).

The CPU 51 records the calculated return rate (b) in the column of return rate on the history table stored in the database 54, and also sends the value of (b), as return rate data of the next following process, to the game machine 2 via the communication interface 53, network NT, and the communication interface circuit 41 with the game machine 2.

Upon completion of the next return rate setting processing, the CPU 51 with the server 1 resets a process history (step S106). The history table (see FIG. 15) stored in the database 54 is used to keep constant the average of the return rates in units of a predetermined number of processes. Therefore, at the achievement of its purpose, it is necessary to create a new history table. This requires the reset of the currently stored process history. This processing is executed under a program stored in the memory 52, based on the instruction of the CPU 51.

When the judgment result of step S101 is that the next return rate setting destination was not the 10th process, the CPU 51 with the server 1 refers to the upper limit value (step S107). The return rates are set to achieve a predetermined average return rate in units of a predetermined number of processes. However, in general, they are also changed depending on the upper limit value. Accordingly, the CPU 51 refers to the column "upper limit value" on the history table. This upper limit value is the upper limit value of the process to which the server 1 attempts to make setting. This value is set by the processing of step S21 shown in FIG. 7, and then recorded in the history table stored in the database 54.

Upon completion of the upper limit value reference processing, the CPU 51 with the server 1 judges whether the upper limit value is 50 (in thousands of yen) or more (step S108). In the first preferred embodiment, the aforesaid 50 (in thousands of yen) that is used as judgment standard for return rate setting, is for purpose of illustration only and is not to be construed as a limiting value.

When the judgment result is that the upper limit value is 50 (in thousands of yen) or more, the CPU 51 with the server 1 sets the return rate of the next following process to 20% or more (step S109). Based on the instruction of the CPU 51, a lottery is performed to determine a return rate value of not less than 20%. This lottery is executed under a program that is stored in the memory 52 and prepared for selecting one from the group of given numeric characters (not less than 20). In the first preferred embodiment, the aforesaid 20% that is used as return rate standard, is for purpose of illustration only and is not to be construed as a limiting value.

The CPU 51 records the numeric character that is the lottery result, as the return rate of the next following process, in the history table stored in the database 54. The return rate so determined is sent to the game machine 2 via the communication interface 53, network NT, and the communication interface circuit 41 with the game machine 2.

On the other hand, when the judgment result in step S108 is that the upper limit value is not 50 (in thousands of yen) or more, the CPU 51 with the server 1 sets a value not more than 20%, as the return rate of the next following process (step S110). Based on the instruction of the CPU 51, a lottery is performed to determine a return rate of not more than 20%. This lottery is executed under a program that is stored in the memory 52 and prepared for selecting one from the group of given numeric characters (not more than 20).

The CPU 51 records the numeric character that is the lottery result, as the return rate of the next following process, in the history table stored in the database 54. The return rate so determined is sent to the game machine 2 via the communication interface 53, network NT, and the communication interface circuit 41 with the game machine 2. Thereafter, the CPU 51 terminates the return rate setting processing.

As described above, the server collectively controls the return rates of the individual game machines. It is therefore avoidable that the return rate of a certain game machine remains at an extremely high or low value. This leads to an increased efficiency of control.

Second Preferred Embodiment

A credit return system according to a second preferred embodiment of the present invention has the same characteristic features as the first preferred embodiment, except that when the server 1 sets the return rates of game machines 2, the average value of the returns rates is kept constant at predetermined time intervals (e.g., every three hours).

Figure 16:
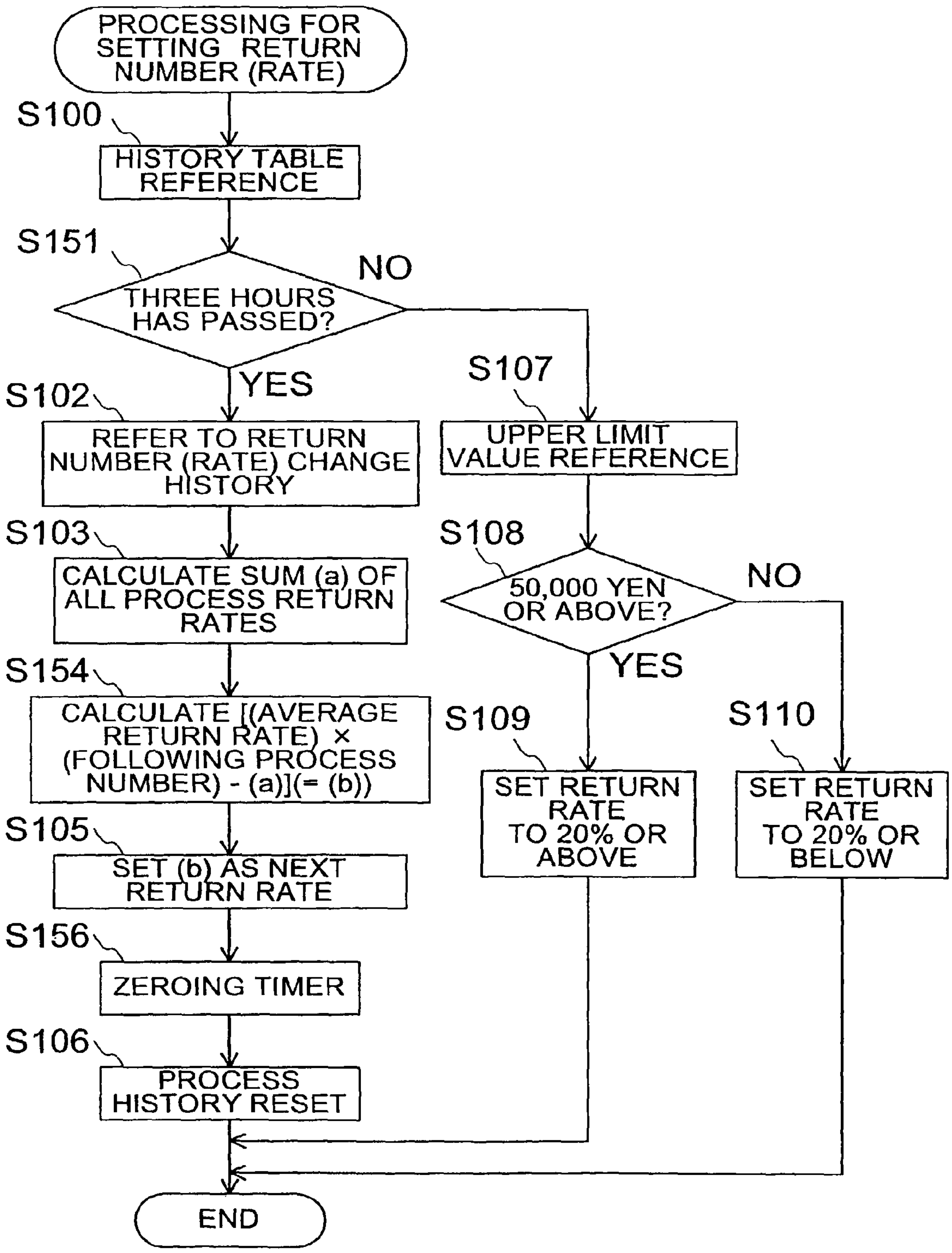
FIG. 16 is a flowchart showing the flow of operation when a game server sets a return rate in a credit return system according to a second preferred embodiment of the invention.

FIG. 16 is a flowchart showing the flow of operation when a server sets a return rate in the credit return system of the second preferred embodiment. In this flowchart, the same step numbers have been retained for similar processing which have the same content as in the flowchart shown in FIG. 14.

Referring to FIG. 16, the CPU 51 with the server 1 firstly refers to a game history table (step S100). As described above, the game history table indicates the past play circumstances of each game machine 2 that is stored in the database 54 with the server 1. In order to refer to this history table, a game machine 2 is required to send the server 1 a machine-number assigned to the game machine 2. The server 1 reads the machine-number received by the CPU 51, and refers to a history table corresponding to the read machine-number. As a game history table of the game machine 2, one that is given in FIG. 15 is usable. Assuming that one process is a term between when a certain value is set as an upper limit value of the game machine 2 and when this upper limit value is changed to another value, the upper limit, return rate, presence of return, amount of return, and setting time of return rate are recorded per process in the game history table.

Upon completion of the reference processing to the game history table, the CPU 51 with the server 1 judges whether three hours has passed from the setting of the return rate of the first process (step S151). The return rates of the game machines 2 are set such that the average return rate to be calculated at predetermined time intervals (every three hours in the second preferred embodiment) is 40% In the second preferred embodiment, the aforesaid average return rate, 40%, and predetermined time intervals, every three hours, are for purpose of illustration only and are not to be construed as a limiting value When the judgment result is that three hours has passed from the setting of the return rate of the first process, the CPU 51 with the server 1 refers to a return rate change history (step S102). As described by using FIG. 15 in the first preferred embodiment, the return rate change history is a history of the return rate changes in the respective processes that are recorded in the column, "return rate." Based on the return rate change history and the average return rate, the return rate of the following next process (i.e., the 10th process) is determined. To achieve the reference processing to the return rate change history, the CPU 51 reads the history table stored in the database 54, as described above.

Upon completion of the reference processing to the return change history, the CPU 51 with the server 1 calculates the sum (a) of the return rates of the processes (step S103). The sum of the return rates of the corresponding processes means the sum of the return rates that the CPU 51 referred to in step S102.

Upon completion of the calculation processing of the return rate sum (a), the CPU 51 with the server 1 calculates term (b), (step S104), by the following expression (2):

$$[(\text{Average return rate})\times(\text{Number of the following processes})-(a)]=(b) \quad (2)$$

The reason for multiplying the average return rate by term, (Number of the following processes), is that the average return rate of all the processes executed during about three hours has a predetermined value (e.g., 40%) when the following next process is started after an elapse of three hours.

Term (b), calculation result of the above expression (2), is value indicating the return rate set to the 10th process that is the first process after an elapse of three hours. In the second preferred embodiment, the return rates are set such that the average return rate every three hours is 40%. Therefore, the return rate of the 10th process is given by the expression: 40(%)×10−(a).

Upon completion of the term (b) calculation processing, the CPU 51 with the server 1 sets the calculation result (b) as the next return rate (step S105). Concretely, the CPU 51 records the calculated return rate (b) in the column "return rate" on the history table stored in the database 54, and also sends the value of (b), as return rate data of the next following process, to the game machine 2 via the communication interface 53, network NT, and the communication interface circuit 41 with the game machine 2.

Upon completion of the next return rate setting processing, the CPU 51 with the server 1 resets a timer (not shown) of the game machine 2 to "0" (step S156). After an elapse of a predetermined time (three hours in the second preferred embodiment), it is required to measure time from "0" and keep the average return rate constant. Therefore, the CPU 51 sends a signal for resetting the timer of the game machine 2 to "0", via the communication interface 53, network NT, and the communication interface circuit 41.

Upon completion of the processing of returning the time to "0", the CPU 51 with the server 1 resets a process history (step S106). The history table stored in the database 54 is used to keep constant the average of the return rates in units of a predetermined number of processes. Therefore, at the achievement of its purpose, it is necessary to create a new history table. This requires the reset of the currently stored process history. This processing is executed under a program stored in the memory 52, based on the instruction of the CPU 51.

On the other hand, when the judgment result of step S151 is that the time elapsing between when the return rate was set to the first process and when a return rate is set to the following next process is not more than three hours, the CPU 51 with the server 1 refers to the upper limit value (step S107). Since the return rates are set to achieve a predetermined average return rate every predetermined time intervals, they normally can also be changed depending on the upper limit value. Therefore, the CPU 51 refers to the column "upper limit value" on the history table. This upper limit value is the upper limit value of the process to which the server 1 attempts to make setting. This value is set by the processing of step S21 shown in FIG. 7, and then recorded in the history table stored in the database 54.

Upon completion of the upper limit value reference processing, the CPU 51 with the server 1 judges whether the upper limit value is 50 (in thousands of yen) or more (step S108). In the second preferred embodiment, the aforesaid 50 (in thousands of yen) that is used as judgment standard for return rate setting, is for purpose of illustration only and is not to be construed as a limiting value.

When the judgment result is that the upper limit value is 50 (in thousands of yen) or more, the CPU 51 with the server 1 sets the return rate of the next following process to 20% or more (step S109). Based on the instruction of the CPU 51, a lottery is performed to determine a return rate value of not less than 20%. This lottery is executed under a program that is stored in the memory 52 and prepared for selecting one from the group of given numeric characters (not less than 20). In the second preferred embodiment, the aforesaid 20% that is used as return rate standard, is for purpose of illustration only and is not to be construed as a limiting value.

The CPU 51 records the numeric character that is the lottery result, as the return rate of the next following process, in the history table stored in the database 54. The return rate so determined is sent to the game machine 2 via the communication interface 53, network NT, and the communication interface circuit 41 with the game machine 2.

On the other hand, when the judgment result in step S108 is that the upper limit value is not 50 (in thousands of yen) or more, the CPU 51 with the server 1 sets a value not more than 20%, as the return rate of the next following process (step S110). Based on the instruction of the CPU 51, a lottery is performed to determine a return rate of not more than 20%. This lottery is executed under a program that is stored in the memory 52 and prepared for selecting one from the group of given numeric characters (not more than 20).

The CPU 51 records the numeric character that is the lottery result, as the return rate of the next following process, in the history table stored in the database 54. As described above, the return rate so determined is sent to the game machine 2 via the communication interface 53, network NT, and the communication interface circuit 41 with the game machine 2. Thereafter, the CPU 51 terminates the return rate setting processing.

As described above, the server collectively controls change in the return rates of the individual game machines. This leads to an increased efficiency of control. Further, since the return rates are properly changed as described above, players can get still higher thrill. Furthermore, since the return rates are changed such that the average return rate is kept constant under predetermined conditions, the players can perform a game without anxiety, while getting high thrill. In addition, since the average return rate is kept constant under the predetermined conditions, the game machine provider can have stable profits.

Third Preferred Embodiment

A credit return system according to a third preferred embodiment of the present invention has the same characteristic features as the first preferred embodiment, except that a server 1 changes the return rate of one game machine 2 in a game machine group under collective control of the server 1, by referring to the return rates of other game machines 2 in the same game machine group.

Figure 17:
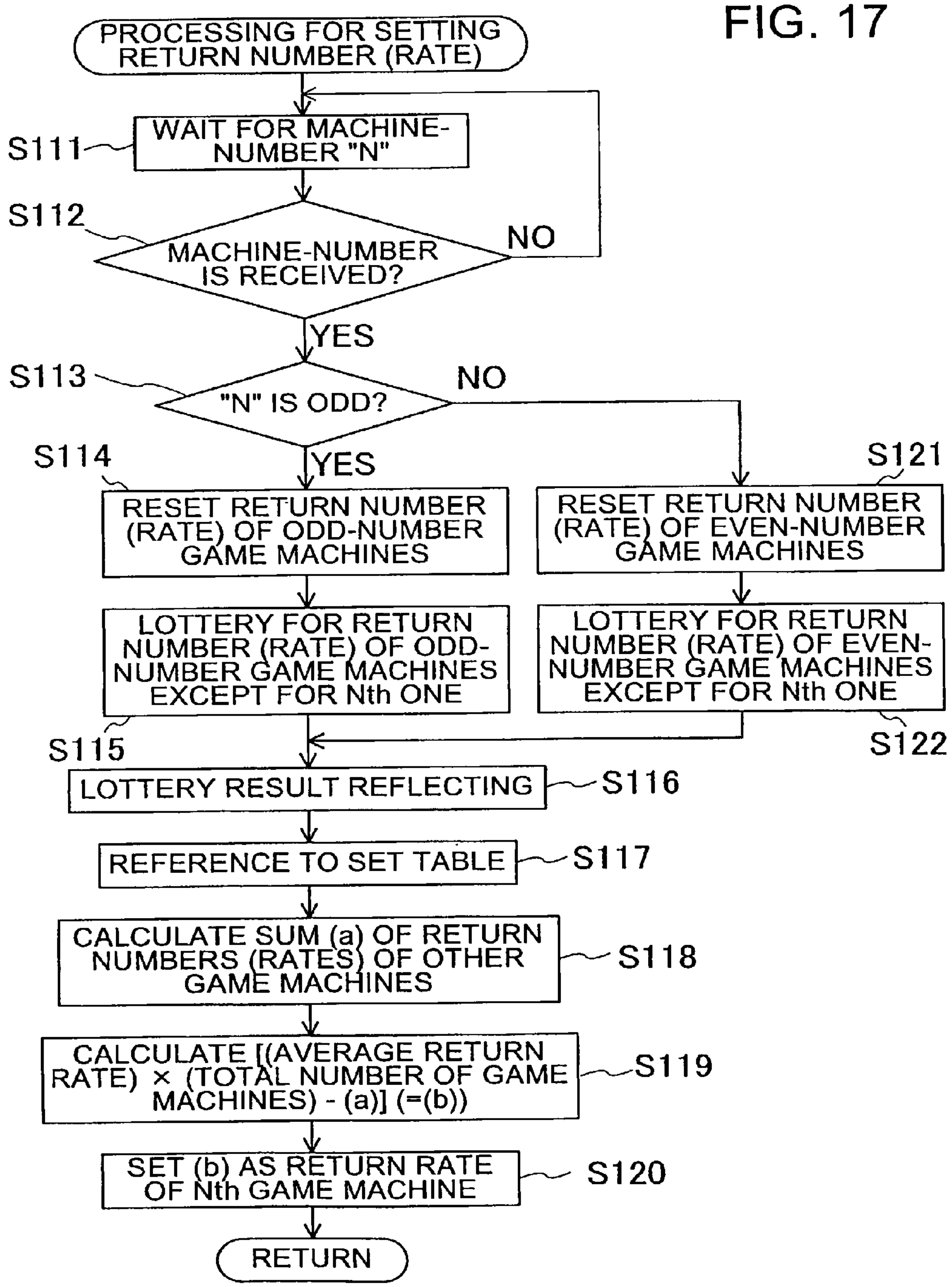
FIG. 17 is a flowchart showing the flow of operation when a game server sets return rates to a plurality of game machines under collective control of the server in a credit return system according to a third preferred embodiment of the invention.

FIG. 17 is a flowchart showing the flow of operation when a server sets the return rates of a plurality of game machines under collective control of the server in the credit return system of the third preferred embodiment. This flowchart is used when a game machine 2 sends the server 1 a signal for urging return rate setting and the server 1 collectively controlling a plurality of game machines 2 receives the signal and sets a return rate, in the subroutine of the return processing (step S30) shown in FIG. 7.

Referring to FIG. 17, the CPU 51 with the server 1 firstly waits for machine-number N (step S111). The term "machine-number" means numbers for discriminating the game machines 2. For example, in the case that the server 1 controls a game machine group G01 comprising a plurality of game machine 2, "G01-N" is appended as machine-number.

In the status of waiting for the machine-number N, the CPU 51 with the server 1 judges whether the machine-number is received at a predetermined timing (step S12). Based on the instruction of the CPU 33 with the game machine 2, machine-number data is sent to the server 1 via the communication interface circuit 41, network NT, and the communication interface 53 with the server 1. For example, the machine-number is sent to the server 1 under the following situations: (i) when the cumulative credit consumption of the player of a game machine 2 reaches the upper limit; (ii) when a return is executed to the game machine 2; or (iii) when the game machine 2 is changed into a game mode advantageous to the player (e.g., a big-prize mode).

When the judgment result is that no machine-number N is received, the CPU 51 with the server 1 returns the processing to step S111 and waits for the machine-number N again.

On the other hand, when the judgment result is that the machine-number N is received, the CPU 51 with the server 1 judges whether the received machine-number N is odd (step S113). The reason for checking whether the machine-number N is odd is that the server 1 changes the return rate every odd or even machine-number. This method is a mere example of implementing the third preferred embodiment. In an alternative, the return rates of a plurality of game machines may not be collectively changed at a time.

When the judgment result is that the machine-number N is odd, the CPU 51 with the server 1 resets the return rates of odd machine-numbers (step S114). The game machines of odd machine-number are game machines having a machine-number wherein units and tens are odd. For the odd machine-number N, the CPU 51 collectively resets the return rates of odd machine-number game machines at a time and sets new return rates. This processing is executed under a program stored in the memory 52, based on the instruction of the CPU 51.

Upon completion of the processing for resetting the return rates of the odd machine-number game machines, the CPU 51 with the server 1 performs a lottery for determining the return rates of odd machine-number game machines 2 except for one having the machine-number N (step S115). This return rate lottery is executed under a program stored in the memory 52, based on the instruction of the CPU 51. Concretely, there is performed a random selection from a certain range of numerical characters (e.g., numeric values between 10 and 200 at five intervals). In this occasion, the average return rate of the game machine group G01 is kept constant. Therefore, the numeric values prepared for lottery are arranged so as to fall within a certain range from the average return rate value.

In the processing of step S115, the return rate setting may be performed to all the game machines but the Nth game machine. In an alternative, as long as the average return rate of the entire game group is kept constant, the return rate of the Nth game machine may be set in preference to other game machines.

Upon completion of the return rate lottery processing to the odd machine-number game machines 2 except for the Nth one, the CPU 51 with the server 1 performs a lottery result reflecting processing (step S116). This lottery result reflecting processing means that the return rate of each game machine 2 determined by the lottery is set as its own return rate, and includes the following processing of: (i) sending the numeric data of the return rates from the server 1 to the game machines 2; and (ii) writing the numeric data on a game history table. These processing are executed under a program stored in the memory 52, based on the instruction of the CPU 51.

Upon completion of the lottery result reflecting processing, the CPU 51 with the server 1 refers to the game history table in order to set the return rate of the Nth game machine (step S117). This game history table is a table on which the upper limit values, return rates, and data of return amount (obtained by multiplying the upper limit value and return rate) are recorded per game machine. One example of game history tables is given in FIG. 18. This game history table is stored in the database 53 and updated every time the setting is performed. The game history table of FIG. 18 is made assuming the case of setting the return rates of the game machines having machine-numbers G01 to G10.

Upon completion of the game history table reference processing, the CPU 51 with the server 1 calculates the sum (a) of the return rates set to the game machines 2 (step S118). The sum (a) means the sum of the return rates of the game machines recorded in the column "return rate" on the history table that the CPU 51 referred to in the processing of step S117. Referring to FIG. 18, 10% to machine-number G01-01, 20% to machine-number G01-02, . . . and 110% to machine number G01-09. The sum of the returns rates of the nine game machines of machine-numbers G01-01 to G01-09 can be calculated by the expression: 10+20+ . . . +110.

Upon completion of the calculation processing of the return rate sum (a), the CPU 51 with the server 1 calculates term (b), (step S119), by the following expression (3):

$$[(\text{Average return rate})\times(\text{Total number of game machines})-(a)]=(b) \tag{3}$$

Term (b), calculation result of expression (3), is value indicating the return rate set to the game machine having machine-number G01-10. In the third preferred embodiment, the return rates are set such that the average return rate of the entire game machine group G01 is 40%. Therefore, the return rate of the game machine having machine-number G01-10 is given by the expression: 40(%)×10−(a).

Upon completion of the term (b) calculation processing, the CPU 51 with the server 1 sets the calculation result (b) as the return rate of the Nth game machine 2 (step S120). Concretely, the CPU 51 records the calculated return rate (b) in the column "return rate" on the history table stored in the database 54, and also sends the value of (b), as return rate data of the game machine having machine-number G01-10, to the game machine 2 via the communication interface 53, network NT, and the communication interface circuit 41 with the game machine 2.

On the other hand, the judgment result of the processing of step S113 is that the game machine number N is not odd (i.e., it is even), the CPU 51 with the server 1 resets the return rates of game machines having an even number (step S121). When the machine-number N is even, in preparation for new return setting, the CPU 51 resets the return rates of the game machines having an even machine-number at a time under a program stored in the memory 52.

Upon completion of the processing for resetting the return rates of the even machine-number game machines, the CPU 51 with the server 1 performs a lottery for determining the return rates of even machine-number game machines 2 except for one having machine-number N (step S122). This return rate lottery is executed under a program stored in the memory 52, based on the instruction of the CPU 51. Concretely, there is performed a random selection from a certain range of numerical characters (e.g., numeric values between 10 and 200 at five intervals). In this occasion, the average return rate of the game machine group G01 is kept constant. Therefore, the numeric values prepared for lottery are arranged so as to fall within a certain range from the average return rate value. Thereafter, the CPU 51 moves the processing to step S116 and later steps.

Passing through the above-mentioned sequence of processing, the return rate setting processing is terminated.

Thus, the server changes the return rate of one game machine depending on the return rates of other game machines, while keeping constant the average return rate of the game machine group under collective control of the server. This increases the efficiency of control of the individual game machines of the game machine group. Further, players will pay attention to the return rate change, thereby making a game more thrilling. In addition, the return rates are not merely changed and, when other game machines of the same game machine group have a low return rate, the return rate of a certain game machine in the same group might be 100% or more. In this occasion, if the player of this game machine reaches the upper limit, the player might have the amount of return exceeding the throw-in amount till then. This produces high game characteristics.

The third preferred embodiment was presented on assumption that one process means the term between when any game machine of a game machine group receives a big prize or reaches the upper limit and when any other game machine of the same game machine group receives a big prize or reaches the upper limit, and the return rates are set so as to keep constant the average return rate per process in the game machine group. In an alternative, the setting of the return rates may be performed so as to keep constant the average return rate of the game machine group at predetermined time intervals.

Fourth Preferred Embodiment

A credit return system according to a fourth preferred embodiment has the same characteristic features as the first-preferred embodiment, except the following points: (i) in a game center (hall) comprising a plurality of game machine groups G01, G02, . . . G10, a game control server 1 collectively controls these game machine groups; and (ii) the game control server 1 changes all the return rates of a certain game machine group among these game machine groups G01, G02, . . . G10, while referring to the return rate of the entire hall.

Figure 19:
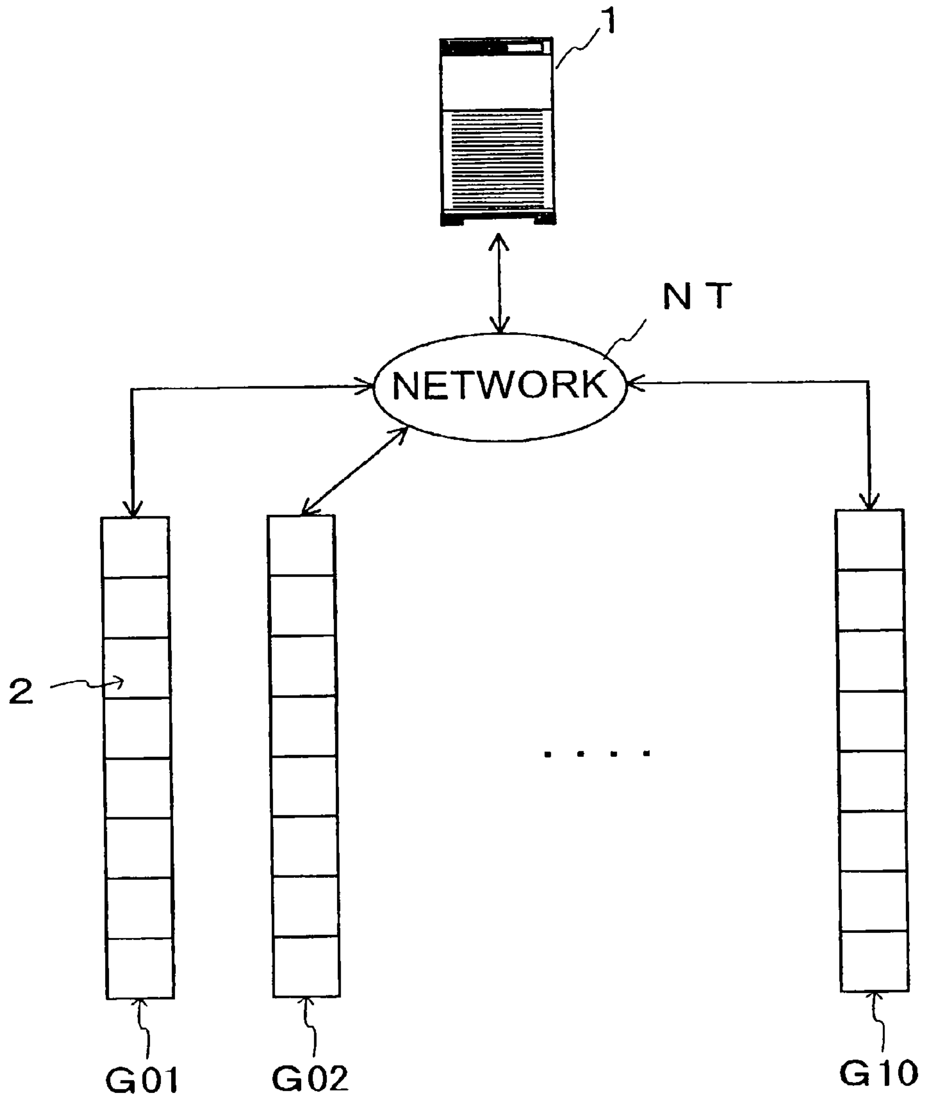
FIG. 19 is a diagram showing, in a simplified form, the configuration of a credit return system according to a fourth preferred embodiment of the present invention.

FIG. 19 is a diagram showing, in simplified form, the configuration of the credit return system of the fourth preferred embodiment. Referring to FIG. 19, the game machines 2 in this credit return system fall into any one of the game machine groups G01, G02, . . . G10.

The game machine groups G01, G02, . . . G10 are connected to the game control server 1 via a network NT. A variety of information can be sent to and received from the game server 1 via the network NT. The term “game center” is to be interpreted in a concept as including these game machine groups G01, G02, . . . G10 and the game control server 1.

The game control server 1 collectively controls these game machine groups G01, G02, . . . G10. Based on machine-group numbers being individual to these game machine groups, the game control server 1 judges the source of data sent from these game groups. On the other hand, machine-numbers are respectively assigned to the game machines 2 constituting the game machine groups G01, . . . G10. Therefore, when sending data to these game machine groups and game machines 2, the game control server 1 designates a target game machine group G01, G02, . . . or G10, and designates a target game machine 2, by using the above-mentioned discrimination numbers.

Data sent from the game machines 2 include (i) discrimination numbers being individual to the game machines 2, and (ii) information for identifying the players of the game machines 2. Based on these information, the game control server 1 judges whether (i) a game machine 2 is in play; and (ii) the player of the game machine 2 is changed to other player.

In the following description, the game control server is merely referred to as a “server.”

Figure 20:
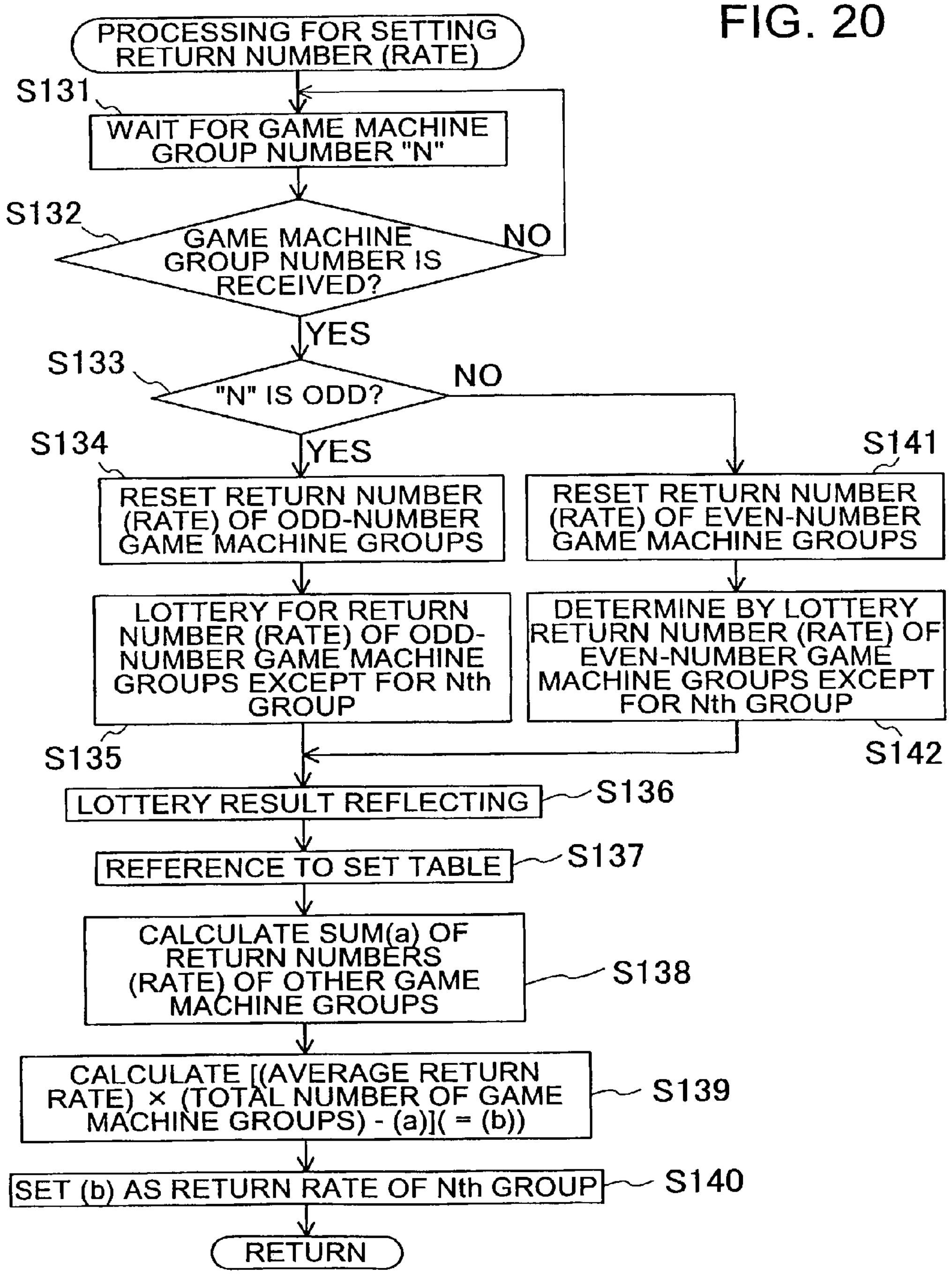
FIG. 20 is a flowchart showing the flow of operation when a game control server sets return rates to a plurality of game machines under collective control of the server.

FIG. 20 is a flowchart showing the flow of operation when a server sets the return rates of a plurality of game machine groups under collective control of the server. This flowchart is used when game machine groups G01, G02, . . . G10 send the server 1 signals for urging the setting of return rates and the server 1 receives the signals and sets the return rates, in the subroutine of the return processing (step S30) shown in FIG. 7.

Referring to FIG. 20, the server 1 firstly waits for game machine group number N (step S131). The game machine group number is a number assigned for discriminating the game machine groups G01, G02, . . . G10. Therefore, the game machines 2 constituting these game machine groups are numbered differently. For example, they have the following discrimination numbers: “G01-01”, “G03-02”, “G10-03”, the first portion of which (e.g., “G01”) indicates a machine group and a second portion (e.g., “01”) indicates a machine-number.

While waiting for the game machine group number N, the CPU 51 with the server 1 judges whether the game machine group number N is received at a predetermined timing (step S132). This judgment processing is achieved by the CPU 51 with the server 1. Therefore, under the instruction of the CPU 33 with a game machine 2 of a certain game machine group, its machine-number data is sent to the CPU 51 via the communication interface circuit 41, network NT, and the communication interface 53 with the server 1. The CPU 51 receives the machine-number data and reads its game machine group part. This game machine group number and machine-number are sent to the server 1 at a predetermined timing, such as (i) when the cumulative credit consumption of the player of the game machine 2 reaches the upper limit; (ii) after a return is executed to the game machine 2; or (iii) when the game machine 2 is changed into a game status advantageous to the player, e.g., a big prize mode.

When the judgment result is that the game machine group number N is not received, the CPU 51 with the server 1 returns the processing to step S131, and waits for a game machine group number again.

On the other hand, when the judgment result is that the game machine number N is received, the CPU 51 with the server 1 judges whether the received game machine number N is odd (step S133). The reason for checking whether the game machine group N is odd is that the server 1 changes the return rate every odd or even game machine group. This method is a mere example of implementing the fourth preferred embodiment. In an alternative, the return rates of a plurality of game machine groups may not be collectively changed at a time.

When the judgment result is that the game machine group N is odd, the CPU 51 with the server 1 resets the return rates of odd game machine groups (step S134). The odd game machine groups have a discrimination number wherein the units and tens of the first portion are odd. For the odd game machine group number N, the CPU 51 collectively resets the return rates of the odd game machine groups at a time and sets their new return rates. This processing is executed under a program stored in the memory 52, based on the instruction of the CPU 51.

Upon completion of the processing for resetting the return rates of the odd game machine groups, the CPU 51 with the server 1 performs a lottery for determining the return rates of all the odd game machine groups but one having the game machine group number N (step S135). This return rate lottery is executed under a program stored in the memory 52, based on the instruction of the CPU 51. Concretely, there is performed a random selection from a certain range of numerical characters (e.g., numeric values between 10 and 200 at five intervals). In this occasion, the average return rate of all the plurality of game machine groups under control of the server 1 (i.e., the entire game center) is kept constant. Therefore, the numeric values prepared for lottery are arranged so as to fall within a certain range from the average return rate value.

In the processing of step S135, the return rate setting may be performed to all the game machine groups but the Nth game machine group. In an alternative, as long as the average return rate of the entire hall is kept constant, the return rate of the Nth game machine group may be set in preference to other game machine groups.

Upon completion of the return rate lottery processing to the odd game machine groups except for the Nth one, the CPU 51 with the server 1 performs a lottery result reflecting processing (step S136). This lottery result reflecting processing means that the return rate of each game machine group determined by the lottery is set as its own return rate, and includes the following processing of: (i) sending the numeric data of the return rates from the server 1 to the game machine groups G01, G02, . . . G10; and (ii) writing the numeric data on a game history table. These processing are executed under a program stored in the memory 52, based on the instruction of the CPU 51.

Upon completion of the lottery result reflecting processing, the CPU 51 with the server 1 refers to the game history table in order to set the return rate of the Nth game machine group (step S137). This game history table is a table on which the upper limit values, return rates, and data of return amount (obtained by multiplying the upper limit value and return rate) are recorded per game machine group. One example of game history tables is given in FIG. 21. This game history table is stored in the database 53 and updated every time the setting is performed. The game history table of FIG. 21 is made assuming the case of setting the return rates of the game machine group G10.

Upon completion of the game history table reference processing, the CPU 51 with the server 1 calculates the sum (a) of the return rates set to the game machine groups G01, G02, . . . G10 (step S138). The sum (a) means the sum of the return rates of the game machine groups recorded in the column "return rate" on the history table that the CPU 51 referred to in the processing of step S137. Referring to FIG. 21, 10% to game machine group G01, 20% to G02, . . . and 110% to G09. The sum of the returns rates of the nine game machine groups of G01 to G09 can be calculated by the expression: 10+20+ . . . +110.

Upon completion of the calculation processing of the return rate sum (a), the CPU 51 with the server 1 calculates term (b), (step S139), by the following expression (4):

$$[(\text{Average return rate})\times(\text{Total number of game machine groups})-(a)]=(b) \quad (4)$$

Term (b), calculation result of expression (4), is value indicating the return rate set to the game machine group G10. In the fourth preferred embodiment, the return rates are set such that the average return rate of the entire hall is 40%. Therefore, the return rate of the game machine group G10 is given by the expression: 40(%)×10−(a).

Upon completion of the term (b) calculation processing, the CPU 51 with the server 1 sets the calculation result (b) as the return rate of the Nth game machine group (step S140). Concretely, the CPU 51 records the calculated return rate (b) in the column "return rate" on the history table stored in the database 54. The CPU 51 also sends the value of (b), as return rate data of the game machine group G10, to the game machines 2 of the game machine group G10, via the communication interface 53, network NT, and the communication interface circuits 41 with the game machines 2.

On the other hand, the judgment result of the processing of step S133 is that the game machine group number N is not odd (i.e., it is even), the CPU 51 with the server 1 resets the return rates of game machine groups having an even number (step S141). In preparation for new return setting, the CPU 51 resets the return rates of the even game machine groups at a time under a program stored in the memory 52.

Upon completion of the processing for resetting the return rates of the even game machine groups, the CPU 51 with the server 1 performs a lottery for determining the return rates of all the even game machine groups but one having the game machine number N (step S142). This return rate lottery is executed under a program stored in the memory 52, based on the instruction of the CPU 51. Concretely, there is performed a random selection from a certain range of numerical characters (e.g., numeric values between 10 and 200 at five intervals). In this occasion, the average return rate of the entire hall is kept constant. Therefore, the numeric values prepared for lottery are arranged so as to fall within a certain range from the average return rate value. Thereafter, the CPU 51 moves the processing to step S136 and later steps.

Passing through the above-mentioned sequence of processing, the return rate setting processing is terminated.

Thus, the game control server changes the return rates of one game machine group depending on the return rates of other game machine groups, while keeping constant the average return rate of the entire game center comprising the plurality of game machine groups under collective control of the game control server. This increases the efficiency of control of the individual game machine groups and individual game machines in the game center. In addition, the game control server changes the entire return rate of one game machine group in the plurality of game machine groups under control of the server, depending on the return rates of other game machine groups. This produces a high stage effect in the entire game center having many game machine groups. This may be the case when, for example, a player performs a game with a game machine of a certain game machine group, and the return rate of an adjacent game machine group is changed to over 100%, this player might move to the adjacent group. At the result, player movement might occur across the game center. On the contrary, if no player movement occurs, the average return rate of the entire game center is kept constant. Therefore, players also pay attention to a return rate change in other game machine groups. Concretely, when the return rate of a game machine group where one player performs a game is increased, this player will be under the eyes of other players and have a sense of superiority at the arrival at the upper limit.

The fourth preferred embodiment was presented on assumption that one process means the term between when any game machine of a game center receives a big prize or reaches the upper limit and when the following next game machine of the game center receives a big prize or reaches the upper limit, and the return rates are set so as to keep constant the average return rate per process in the game center. In an alternative, the setting of the return rates may be performed so as to keep constant the average return rate of the entire game center at predetermined time intervals.

Although in the fourth preferred embodiment, the average return rate is kept constant per game center comprising a plurality of game machine groups, a game center group comprising a plurality of game centers may be collectively controlled so as to keep constant the average return rate of the game center group. In this case, if a game machine provider has a plurality of places (game centers) to provide game machines across many communities, there can be a high possibility that players perform games while changing from game center to game center. This is advantageous to the game machine provider.

While but the first to fourth preferred embodiments of the invention have been shown and described, it will be understood that many changes and modifications may be made therein without departing from the spirit or scope of the present invention.

What is claimed is:

1. A game server for collectively controlling a game machine group comprising a plurality of game machines which are brought into a status enabling to start a game based on coin throwing or a given credit number and are given payout according to a result of said game, said game server including:

return means that judges, based on information of credit consumption on a game machine where a player performs a game, cumulative credit consumption of said player and, when a judgment result is that said cumulative credit consumption reaches a predetermined upper limit, executes a return based on a predetermined return rate or based on a result of lottery for determining whether the return is to be executed, said return being executed regardless of a game result; and a first sending means for sending said game machine a signal that changes the return rate value of said game machine of said game machine group depending on return rate values of other game machines, wherein the return rate value is set by the return means in reference to a game history of the game machine and history of the return rate value change by calculating a sum of process return rates, and calculating and setting as the return rate a product of an average return rate times N, minus the sum of process return rates, so that the return rate value of the gaming machine that is within the game machine group is changed in reference to the return rate value of the game machine group, N being a predetermined number of processes.

2. The game server according to claim 1 further including:

receiving means for receiving game information about game situations in each game machine of said game machine group; and a second sending means for sending, based on contents of said game information, a signal for displaying the value of said predetermined return rate on a display part of said each game machine.

3. The game server according to claim 1 further including:

a third sending means for sending said game machine a control signal for keeping constant an average return rate value of said game machine group, under predetermined conditions.

4. The game server according to claim 3 wherein said predetermined conditions are based on either predetermined period of time or predetermined number of processes, each of the processes comprising processing that after a first game machine of said game machine group reaches said predetermined upper limit, a cumulative credit consumption on any one game machine of said game machine group that includes said first game machine reaches said predetermined upper limit.

5. A game machine that is one of a plurality of game machines forming a game machine group under a collective control of a game server, which are brought into a status enabling to start a game based on coin throwing or a given credit number and are given payout according to a result of said game, said game machine including:

return means that executes a return, when cumulative credit consumption reaches a predetermined upper limit, based on a predetermined return rate or based on a result of lottery for determining whether the return is to be executed, said return being executed regardless of a game result; and change means that receives a signal sent from said game server and changes the return rate value of said game machine of said game machine group, depending on return rates of other game machines of said game machine group, wherein the return rate value is set by the return means in reference to a game history of the game machine and history of the return rate value change by calculating a sum of process return rates, and calculating and setting as the return rate a product of an average return rate times N, minus the sum of process return rates, so that the return rate value of the gaming machine that is within the game machine group is changed in reference to the return rate value of the game machine group, N being a predetermined number of processes.

6. The game machine according to claim 5 further including:

sending means for sending game information about game situations; and display means that receives a signal sent from said game server and displays the value of said predetermined return rate on a display part, based on contents of said game information.

7. The game machine according to claim 5 wherein said change means changes the return rate value while keeping an average value of the return rates, under predetermined conditions.

8. The game machine according to claim 7 wherein said predetermined conditions are based on either predetermined period of time or predetermined number of processes, each of the processes comprising processing that after a first game machine of said game machine group reaches said predetermined upper limit, a cumulative credit consumption on any one game machine of said game machine group that includes said first game machine reaches said predetermined upper limit.

9. A game control method of collectively controlling a game machine group comprising a plurality of game machines which are brought into a status enabling to start a game based on coin throwing or a given credit number and which are given payout according to a result of said game, said game control method including:

a check step for checking cumulative credit consumptions on said plurality of game machines;

a return step of executing a return with a game machine, when it is determined that cumulative credit consumption of said game machine reaches a predetermined upper limit in the check step, based on a predetermined return rate or based on a result of lottery for determining whether the return is to be executed, said return being executed regardless of a game result; and a first sending step for sending said game machine a signal that changes the return rate value of said game machine of said game machine group depending on return rate values of other game machines, wherein the return rate value is set by the return step in reference to a game history of the game machine and history of the return rate value change by calculating a sum of process return rates, and calculating and setting as the return rate a product of an average return rate times N, minus the sum of process return rates, so that the return rate value of the gaming machine that is within the game machine group is changed in reference to the return rate value of the game machine group, N being a predetermined number of processes.

10. The game control method according to claim 9 further including:

a receiving step for receiving game information about game situations of each game machine of said game machine group; and a second sending step for sending a signal for displaying the value of said predetermined return rate on a display part of said each game machine.

11. The game control method according to claim 9 further including:

a third sending step for sending said game machine a control signal for keeping constant an average return rate value of said game machine group, under predetermined conditions.

12. The game control method according to claim 11 wherein said predetermined conditions are based on either predetermined period of time or predetermined number of processes, each of the processes comprising processing that after a first game machine of said game machine group reaches said predetermined upper limit, a cumulative credit consumption on any one game machine of said game machine group that includes said first game machine reaches said predetermined upper limit.

13. A game server for collectively controlling a game machine group comprising a plurality of game machines that are brought into a status enabling to start a game based on coin throwing or a given credit number and are given payout according to a result of said game, said game server including:

a processor programmed to judge, based on information of credit consumption on a game machine where a player performs a game, cumulative credit consumption of said player and, when a judgment result is that said cumulative credit consumption reaches a predetermined upper limit, executes a return based on a predetermined return rate or based on a result of lottery for determining whether the return is to be executed, said return being executed regardless of a game result; and an interface through which said processor sends a signal that changes the return rate value of said game machine of said game machine group depending on return rate values of other game machines, wherein the return rate value is set by the processor in reference to a game history of the game machine and history of the return rate value change by calculating a sum of process return rates, and calculating and setting as the return rate a product of an average return rate times N, minus the sum of process return rates, so that the return rate value of the gaming machine that is within the game machine group is changed in reference to the return rate value of the game machine group, N being a predetermined number of processes.

14. A game server for collectively controlling a game machine group comprising a plurality of game machines which are brought into a status enabling to start a game based on coin throwing or a given credit number and are given payout according to a result of said game, said game server including:

return means that judges, based on information of credit consumption on a game machine where a player performs a game, cumulative credit consumption of said player and, when a judgment result is that said cumulative credit consumption reaches a predetermined upper limit, executes a return based on a predetermined return rate or based on a result of lottery for determining whether the return is to be executed, said return being executed regardless of a game result; and a first sending means for sending said game machine a signal that changes the return rate value of said game machine of said game machine group depending on return rate values of other game machines, wherein the return rate value is set by the return means in reference to a game history of the game machine and history of the return rate value change by calculating a sum of return rates of other game machines in the game machine group, and calculating and setting as the return rate a product of an average return rate and a number of game machines in the game machine group, minus the sum of return rates, so that the return rate value of the gaming machine that is within the game machine group is changed in reference to the return rate value of the game machine group.

* * * * *